(12) United States Patent
Parikh et al.

(10) Patent No.: US 11,192,399 B2
(45) Date of Patent: Dec. 7, 2021

(54) CASTER HUB

(71) Applicant: Peer Bearing Company, Waukegan, IL (US)

(72) Inventors: Rikin B. Parikh, Des Plaines, IL (US); Daniel N. Mazzarella, Gurnee, IL (US); Waclaw W. Szatan, Lake Barrington, IL (US); Renato Luccas da Costa, Round Lake, IL (US); Christopher Joseph Larson, Hobart, IN (US)

(73) Assignee: Peer Bearing Company, Waukegan, IL (US)

( * ) Notice: Subject to any disclaimer, the term of this patent is extended or adjusted under 35 U.S.C. 154(b) by 0 days.

(21) Appl. No.: 17/088,669

(22) Filed: Nov. 4, 2020

(65) Prior Publication Data

US 2021/0129583 A1 May 6, 2021

Related U.S. Application Data

(60) Provisional application No. 62/931,508, filed on Nov. 6, 2019.

(51) Int. Cl.
*F16C 19/54* (2006.01)
*F16C 33/58* (2006.01)
(Continued)

(52) U.S. Cl.
CPC ........ *B60B 27/001* (2013.01); *B60B 33/0028* (2013.01); *F16C 19/54* (2013.01);
(Continued)

(58) Field of Classification Search
CPC ...... F16C 19/54; F16C 19/547; F16C 19/548; F16C 33/58; F16C 33/7886;
(Continued)

(56) References Cited

U.S. PATENT DOCUMENTS 2,427,831 A * 9/1947 Bennett ................. F16C 35/063
384/589
2,566,322 A * 9/1951 Fort ........................ B60B 37/06
384/477

(Continued)

FOREIGN PATENT DOCUMENTS

| DE | 9301361 U1 * | 7/1993 | ......... B60B 33/0028 |
| DE | 20119107 U1 * | 4/2003 | ............. B65G 39/09 |
| DE | 202004008479 U1 * | 10/2005 | ......... B60B 33/0049 |

*Primary Examiner* — Phillip A Johnson
(74) *Attorney, Agent, or Firm* — Cook Alex Ltd.

(57) ABSTRACT

A caster hub is provided that includes a housing having a wall with internal and external surfaces and an axial bore defined by the wall. First and second bearings are disposed coaxially in the bore of the housing. Each bearing has a cylindrical inner race and a cylindrical outer race, with the races separated by rolling elements, and the races defining interior and exterior radial end faces of the bearings. A seat is disposed in the bore that is connected to the internal surface of the wall between the first and second bearings. The seat is engageable with the outer races of the bearings at the confronting interior end faces of the bearings. An inner spacer is disposed in the bore between the first and second bearings, the inner spacer being engageable with the inner races of the bearings at the confronting interior end faces of the bearings.

19 Claims, 26 Drawing Sheets

(51) Int. Cl.
  *F16C 33/76* (2006.01)
  *B60B 27/00* (2006.01)
  *B60B 33/00* (2006.01)
  *F16C 33/78* (2006.01)
(52) U.S. Cl.
  CPC ............ *F16C 19/548* (2013.01); *F16C 33/58* (2013.01); *F16C 33/7886* (2013.01); *F16C 2326/02* (2013.01)
(58) Field of Classification Search
  CPC ............. F16C 33/7889; F16C 2326/02; B60B 27/001; B60B 33/0028; B60B 33/0039; B60B 33/0057; B60B 33/0068; B60B 33/0073; B60B 2380/12; B60B 2380/14
  See application file for complete search history.

(56) References Cited

U.S. PATENT DOCUMENTS

| | | | | |
|---|---|---|---|---|
| 2,818,302 A * | 12/1957 | Black, Jr. | ................ | F16C 33/76 301/64.303 |
| 2,914,364 A * | 11/1959 | Ross | ................ | F16C 35/073 384/477 |
| 2,962,329 A * | 11/1960 | Moore | ................ | F16C 33/78 384/489 |
| 3,156,506 A * | 11/1964 | Scheifele | ................ | B60B 3/18 384/589 |
| 3,309,155 A * | 3/1967 | Palmer | ................ | F16C 13/006 384/540 |
| 3,807,817 A * | 4/1974 | Black | ................ | F16C 35/077 384/543 |
| 4,054,335 A * | 10/1977 | Timmer | ................ | B60B 33/0028 384/482 |
| 4,295,686 A * | 10/1981 | Black | ................ | B60B 27/02 301/64.302 |
| RE31,110 E * | 12/1982 | Black | ................ | B60B 33/0028 16/46 |
| 4,759,097 A * | 7/1988 | Black | ................ | B60B 33/0002 16/18 CG |
| 4,909,523 A * | 3/1990 | Olson | ................ | A63C 17/06 280/11.225 |
| 5,002,163 A * | 3/1991 | Kidd | ................ | B60B 33/021 16/35 R |
| 5,048,848 A * | 9/1991 | Olson | ................ | A63C 17/223 280/11.232 |
| 6,840,679 B2 | 1/2005 | Lenick et al. | | |
| 6,880,203 B1 * | 4/2005 | Aubin | ................ | B60B 33/0028 16/31 R |
| 7,258,491 B2 | 8/2007 | Gutowski et al. | | |
| 7,306,375 B2 | 12/2007 | Lenick et al. | | |
| 8,863,355 B1 * | 10/2014 | Lee | ................ | B60B 33/0047 16/46 |
| 9,157,475 B2 | 10/2015 | Gutowski et al. | | |
| 9,206,838 B2 * | 12/2015 | Mola | ................ | F16C 13/006 |

* cited by examiner

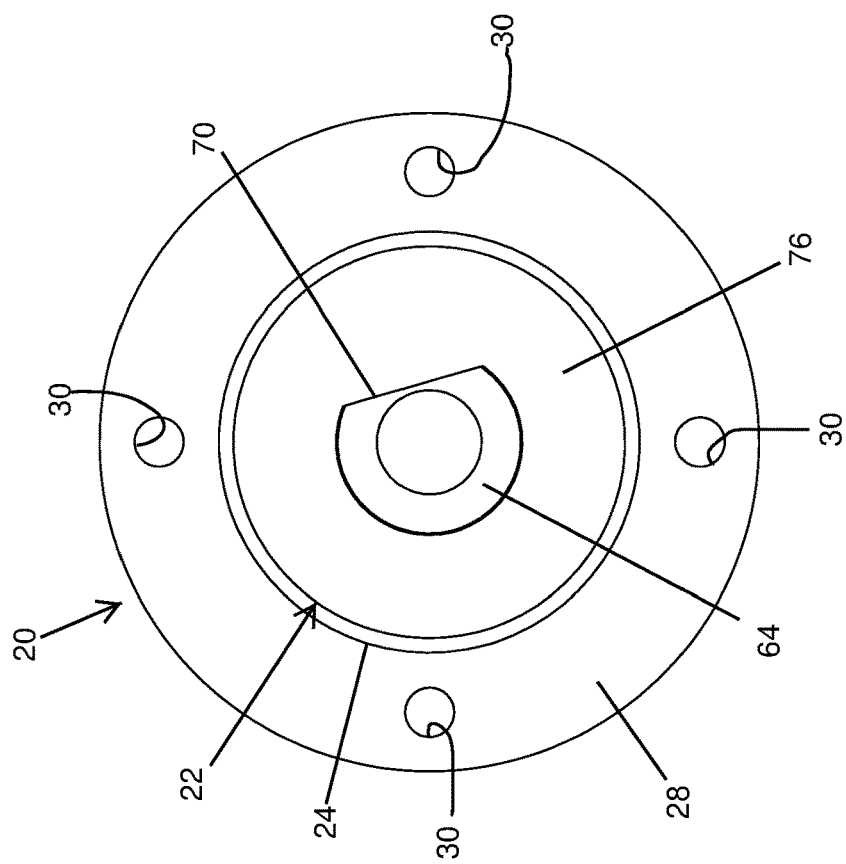
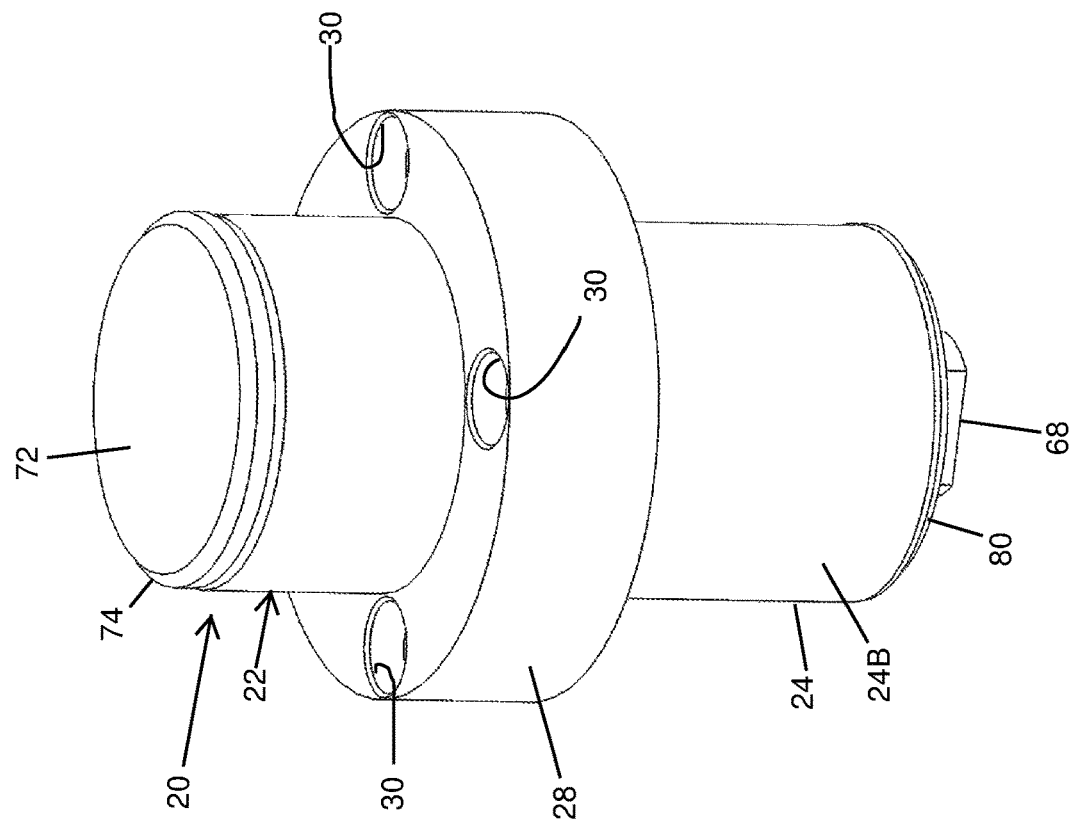

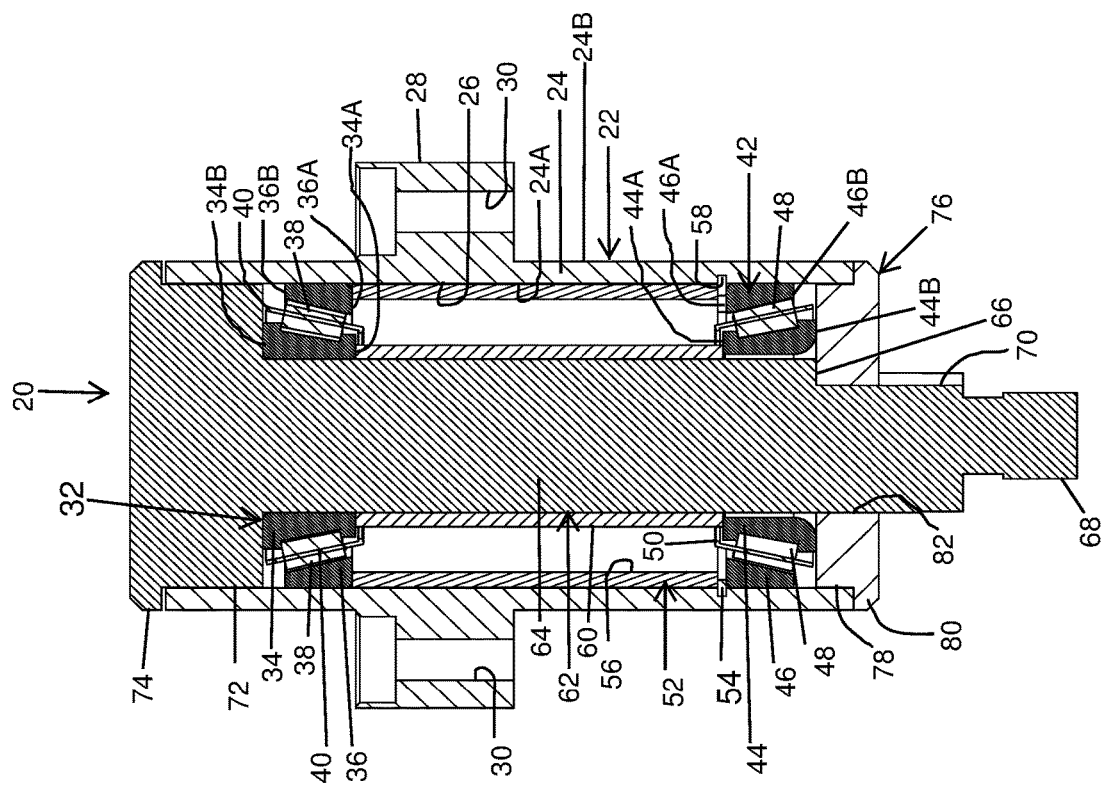
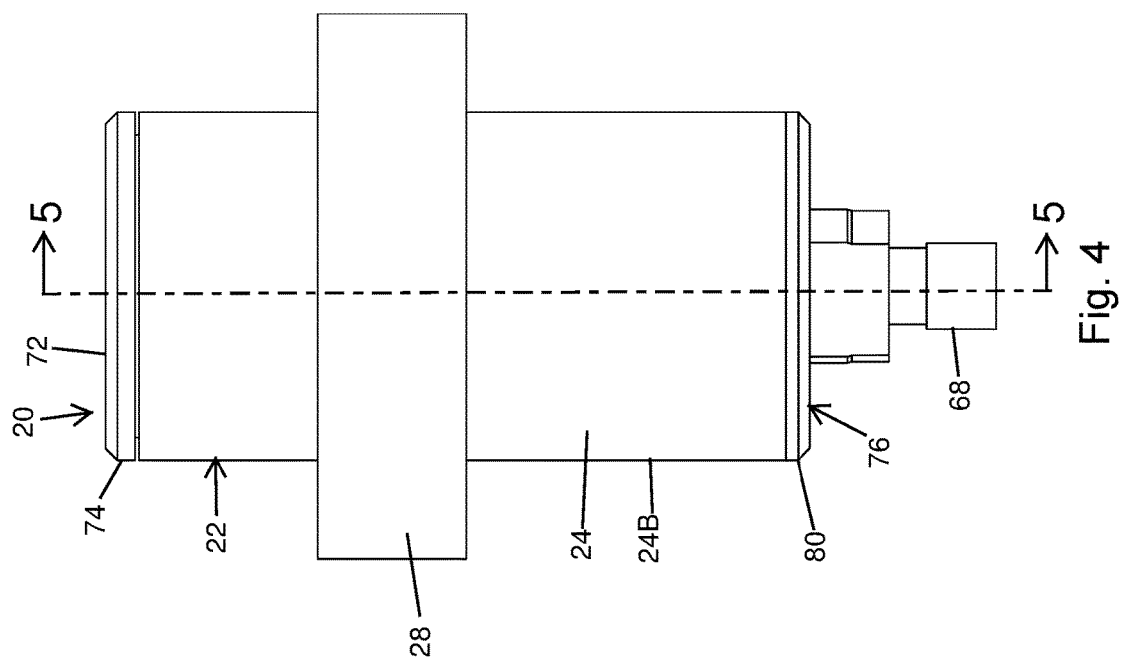
Fig. 5
Fig. 4

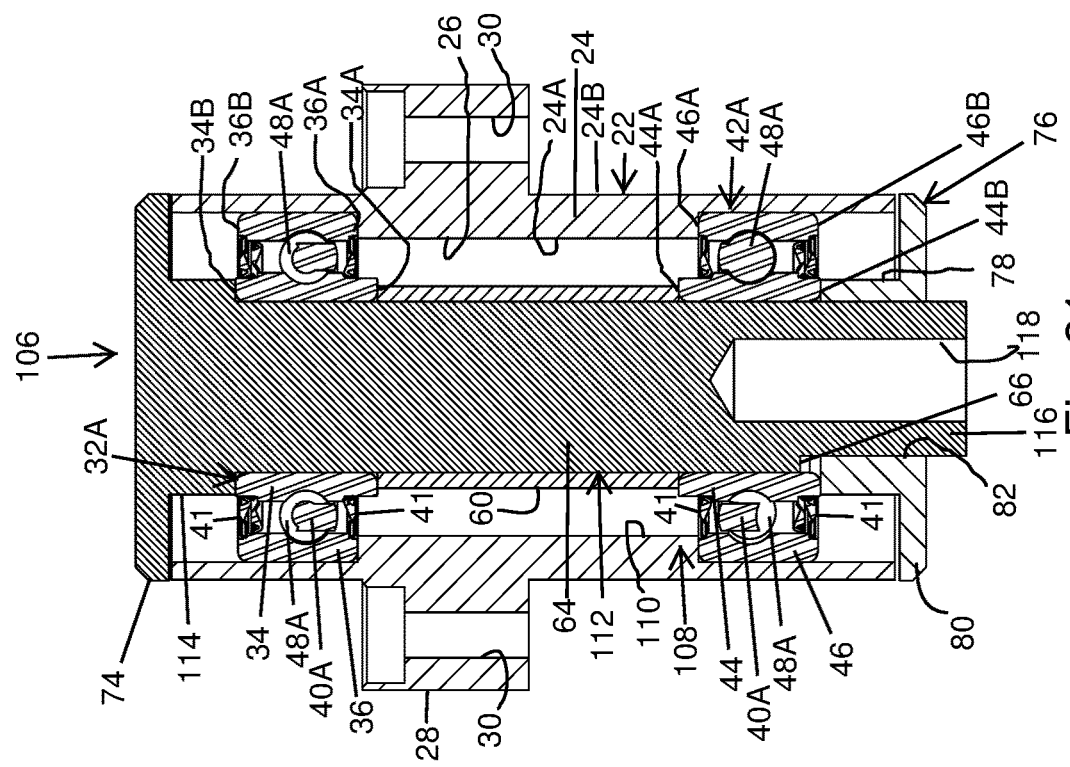
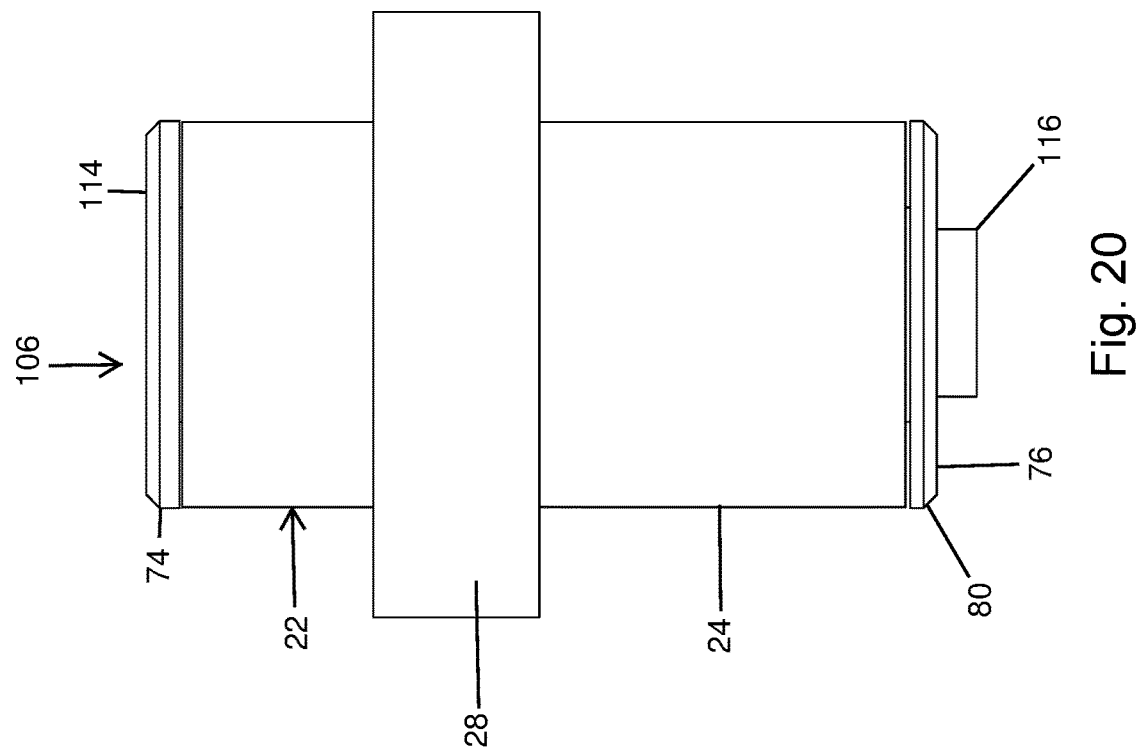

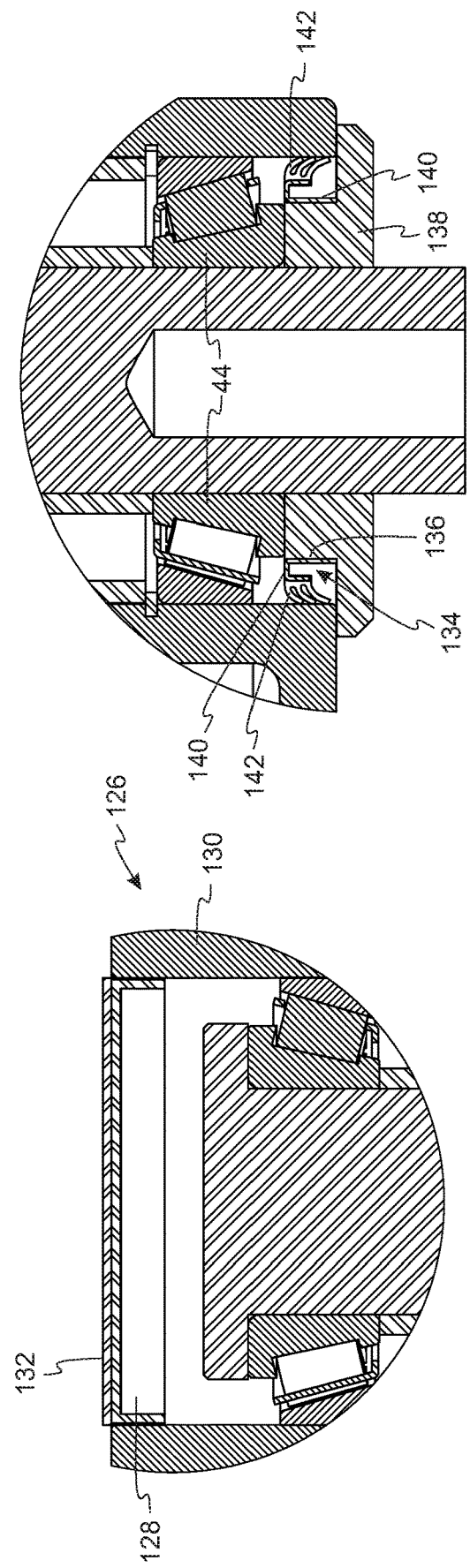

CASTER HUB

FIELD OF THE DISCLOSURE

The present disclosure is directed to a hub for swivel-type casters.

BACKGROUND

A caster is a wheeled apparatus used to support a movable object such as a cart or a vehicle. A caster includes a fork, also known as a yoke, horn or rig. The fork has a horizontal base to which are mounted a pair of elongated, spaced apart fork legs. The fork legs support a horizontal axle at or near the free ends of the fork legs. A wheel is mounted for rotation on the horizontal axle between the fork legs. Some fork bases are fixed to the movable object and thus allow rolling movement of the wheel only in a straight line. However, the present disclosure concerns swivel-type casters wherein the fork is mounted for rotation about a vertical axis. This allows the caster to turn in any direction. Swivel casters are used in a wide variety of applications. One application for which the present disclosure has an advantage is lawn and garden and power equipment and in particular zero-turn lawn mowers. The caster is a crucial part of such equipment and provides support and the capability to turn in any direction.

Casters present a difficult assembly process for the manufacturer of lawn mowers. Many swivel-type casters are assembled not following the proper method. In particular, if the bearings for the fork do not have the proper pre-loading, operational problems will occur. For example, if the fork bearings are overloaded the caster will not turn readily, causing the wheel to scrub along the ground which damages both the ground surface and the wheel. Premature wear of both the wheel and the bearings results. On the other hand, if the fork bearings are not sufficiently pre-loaded flutter or shimmy of the caster may result. At best flutter gives the impression of a cheaply made product. At worst flutter can cause steering errors. Thus, improper loading will cause problems right up the supply chain from the end users to the dealers and ultimately to the manufacturers of this equipment. The caster hub of the present offers the simplicity of properly assembled bearings using years of bearing knowledge in a pre-assembled hub that is mounted to a frame with unique mounting options.

SUMMARY

In one aspect the present disclosure concerns a caster hub having a housing which has a wall with internal and external surfaces. An axial bore in the housing is defined by the wall. First and second bearings are disposed coaxially in the bore of the housing. Each bearing has a cylindrical inner race and a cylindrical outer race. The races are separated by rolling elements, such a balls or rollers. The races define interior and exterior radial end faces of the bearings.

A seat is disposed in the housing's bore and is connected to the internal surface of the wall between the first and second bearings. The seat is engageable with the outer races of the bearings at facing interior end faces of the bearings. The seat can take alternate forms. In one embodiment the seat is defined by a shoulder which is integrally formed on the internal surface of the wall. In an alternate embodiment the seat is defined by a snap ring and an outer spacer. The internal surface of the wall has a groove formed therein. The snap ring is held in the groove. The outer spacer has one end engageable with an outer race of one of the bearings at the interior end face thereof. The outer spacer has a second end abutting one side of the snap ring. The other side of the snap ring is engageable with an outer race of one of the bearings at the interior end face thereof.

An inner spacer is disposed in the housing's bore between the first and second bearings. The inner spacer is engageable with the inner races of the bearings at the facing interior end faces of the bearings. A shaft may be mounted for rotation in the first and second bearings. One end of the shaft is attached to the base of the fork, thereby mounting the fork for rotation with the shaft. The inner and outer spacers help control the torque needed to rotate the shaft. This is especially true with versions using a tapered roller bearing for the rolling element. The spacers can preload the bearing by varying the forces on the inner and outer races of the bearing.

The caster hub of the present disclosure will simplify assembly of the caster into the complete movable object. The hub will be a single assembly that will allow the manufacturers easier installation of the caster because the bearings come pre-installed in the hub. The caster hub has a variety of mounting options to speed up manufacturing and assembly. The product will have the bearings correctly set and will cut down rework and replacement on the part of the equipment manufacturers.

This will positively affect the equipment manufacturers and the end user of the equipment. The caster hub was design for flexibility. It will cut manufacturing time and will allow the equipment manufacturer to be more efficient and offer a new whole product to their customers. The end users will receive a product that will be installed using proper bearing knowledge. The simple mounting option will allow for quick manufacturing and quick dismounting for the end user.

BRIEF DESCRIPTION OF THE DRAWINGS

FIG. 2 is a perspective view of a first embodiment of the caster hub of the present disclosure.

FIG. 3 is a bottom plan view of the caster hub of FIG. 2.

FIG. 4 is a front elevation view of the caster hub of FIG. 2.

FIG. 5 is a section taken along line 5-5 of FIG. 4.

FIG. 20 is a front elevation view of the caster hub of FIG. 18.

FIG. 21 is a section taken along line 21-21 of FIG. 19.

FIG. 34 is an enlarged cross sectional view of a portion of a caster hub according to the present disclosure showing a cap seal for the assembly.

FIG. 35 is an enlarged cross sectional view of a portion of a caster hub according to the present disclosure showing an internal seal that is press-fit onto an interior shoulder of the caster cap.

DETAILED DESCRIPTION OF THE EMBODIMENTS

Figure 1:
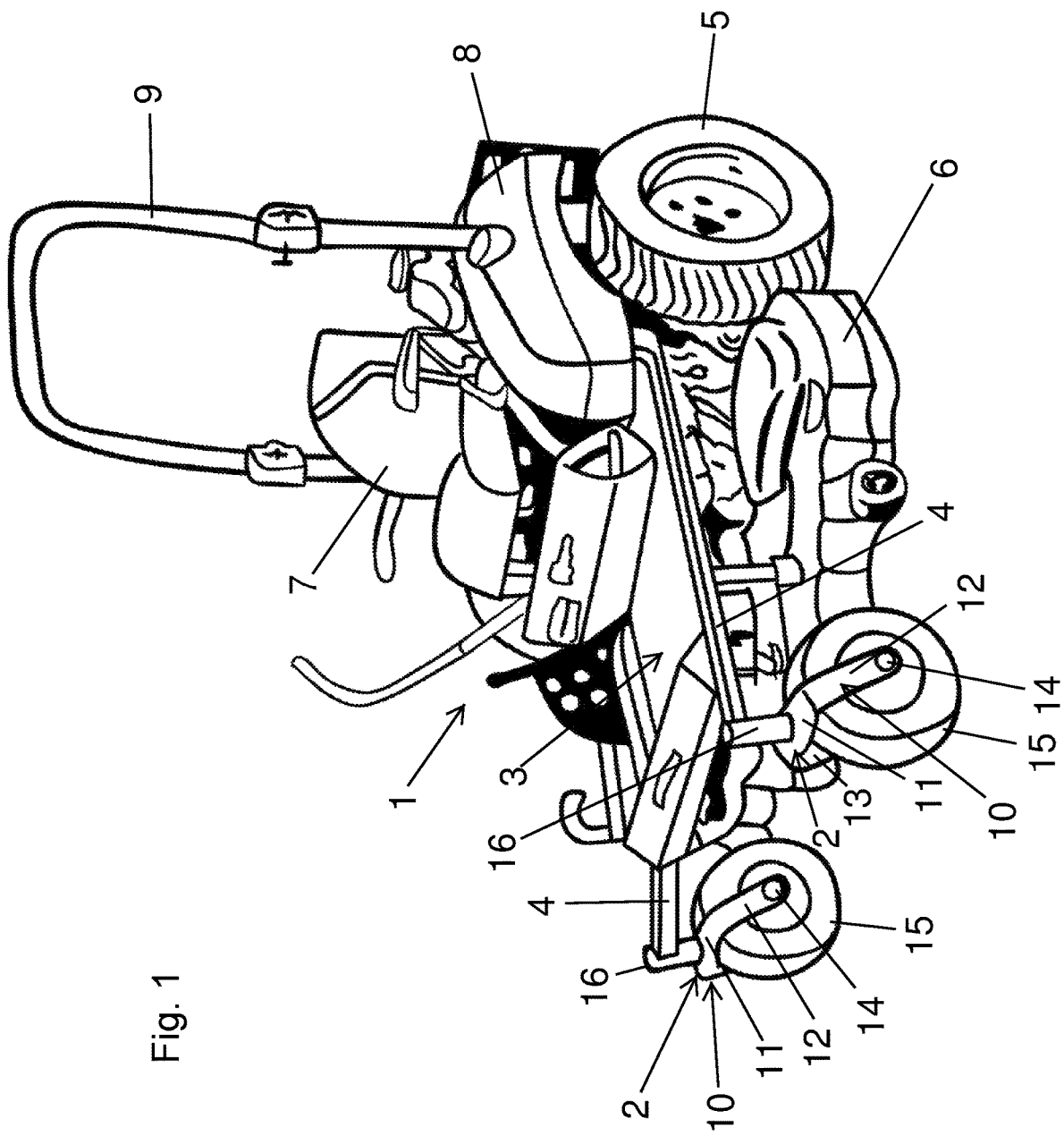
FIG. 1 is a perspective view of a zero-turn lawn mower, illustrating a typical environment in which the caster hub of the present disclosure may be utilized.

FIG. 1 illustrates a zero-turn lawn mower 1 having a pair of casters 2 at the front corners of the mower's chassis 3. This is a typical environment in which the caster hub of the present disclosure may be utilized. The chassis 3 may include frame pieces 4 for mounting the casters 2. The mower 1 typically also includes rear drive wheels 5, a mower deck 6, an operator's chair 7, fenders 8 and a roll bar 9.

Each caster 2 includes a fork 10, which is also sometimes called a yoke, horn or rig. The fork 10 has a generally horizontal base 11 to which are mounted a pair of elongated, spaced apart fork legs 12 and 13. The fork legs 12, 13 support a horizontal axle 14 at or near the free ends of the fork legs. A wheel 15 is mounted for rotation on the horizontal axle 14 between the fork legs 12, 13. The fork 10 is mounted for rotation in a caster housing 16. The housing 16 is attached by a suitable method to the frame pieces 4 of the mower chassis 3. Although not shown in FIG. 1, it will be understood that internally the housing contains a shaft or kingpin that is mounted for rotation about a vertical axis in bearings contained in the housing. The lower end of the shaft is fixed to the base 11 of the fork 10 such that the fork and shaft pivot together about a vertical axis.

Details of a first embodiment of a caster hub 20 are shown in FIGS. 2-5. The hub 20 has a housing shown at 22. The housing 22 has a generally cylindrical wall 24 with internal and external surfaces 24A and 24B. An axial bore 26 in the housing is defined by the wall 24 and specifically by the internal surface 24A.

A flange 28 is attached to the external wall surface 24B and extends radially beyond the external wall surface. The flange in this embodiment completely surrounds the housing, although it could only partially surround the housing. Or the flange could have multiple portions separated by a hiatus. There are axial bolt holes 30 through the flange 28. The bolt holes are arranged to match similar holes (not shown) in the chassis 3 or specially adapted frame piece 4 of a mower or some other movable apparatus supported by the caster hub. Bolts (not shown) would be placed in the bolt holes 30 and those of the chassis to fasten the caster hub 20 to the chassis. Several alternate embodiments for attaching a caster hub to a chassis will be shown and described below.

First and second bearings are disposed coaxially in the bore 26 of the housing 22. The first or upper bearing 32 has a cylindrical inner race 34 and a cylindrical outer race 36. The races are separated by rolling elements. In this case the rolling elements are tapered rollers 38, although balls or other rolling elements could be used. A cage 40 may be used to retain the rollers in place. The inner race 34 defines interior and exterior radial end faces 34A, 34B respectively of the bearing 32. The outer race 36 similarly defines interior and exterior radial end faces 36A, 36B respectively of the bearing 32. The second or lower bearing 42 has a cylindrical inner race 44 and a cylindrical outer ace 46. The races are separated by rolling elements. In this case the rolling elements are tapered rollers 48, although balls or other rolling elements could be used. A cage 50 may be used to retain the rollers in place. The inner race 44 defines interior and exterior radial end faces 44A, 44B respectively of the bearing 44. The outer race 46 similarly defines interior and exterior radial end faces 46A, 46B respectively of the bearing 42.

A seat is disposed in the housing's bore 26 and is connected to the internal surface 24A of the wall 24 between the first and second bearings 32 and 40. The seat is engageable with the outer races 36 and 46 of the bearings at facing interior end faces 36A, 42A of the bearings. The seat can take alternate forms. As will be shown below, in one embodiment the seat is defined by a shoulder which is integrally formed on the internal surface 24A of the housing wall 24. In the embodiment shown here the seat is shown generally at 52 and is defined by a snap ring 54 and a cylindrical, outer spacer 56. The internal surface 24A of the wall 24 has a groove 58 formed therein. The snap ring 54 is held in the groove 58. The outer spacer 56 has its upper end engageable with the outer race 36 of the first bearing 32 at the interior end face 36A thereof. The outer spacer 56 has its second, lower end abutting the upper side of the snap ring 54. The other, lower side of the snap ring 54 is engageable with the outer race 46 of the second bearing 42 at the interior end face 46A thereof.

An inner spacer 60 is disposed in the housing's bore 24 between the first and second bearings 32, 42. The inner spacer 60 is engageable with the inner races 34, 44 of the bearings at the facing interior end faces 34A, 44A of the bearings.

A shaft 62 may be mounted for rotation in the first and second bearings 32, 42. The shaft 62 has a shank 64 which is bounded at the lower end by a shoulder 66. The shoulder 66 defines a stem 68 below the shoulder. The stem 68 protrudes from the bottom of the housing 22 and is adapted to be joined to the fork 10 of a caster. A flat 70 may be formed on the bottom of the stem to assist in locking the stem to the fork 10. At its upper end the shank 64 is bounded by a head 72. The head 72 has a larger outside diameter than the shank 64. The head 72 is engageable with the inner race 34 of the upper bearing 32 at an exterior end face 34B thereof. It will be noted that the exterior end face 34B of the inner ring 34 has a greater axial extent than the exterior end face 36B of the outer race 36. This leaves space for the cage 40 and assures the rotating head 72 will not contact the stationary outer race 36.

The shaft 62 also has a rim 74 attached to the head 72 and having an outside diameter substantially equal to that of the housing. The rim 74 is disposed slightly axially spaced from the top land of the housing 22 to prevent contact between these relatively moving parts. In a similar vein, the outside diameter of the head 72 is slightly less than the interior diameter of the housing to prevent contact between the head and the housing.

As mentioned above the stem 68 of the shaft 62 is attached to the base of the fork 10, thereby mounting the fork for rotation with the shaft. The outer and inner spacers 56, 60 help control the torque needed to rotate the shaft 62. This is especially true with versions using a tapered roller bearing for the rolling element. The spacers 56, 60 can preload the bearing by varying the forces on the inner and outer races of the bearing.

The caster hub 20 further includes a cap 76 attached to the shaft 62 for rotation therewith. The cap 76 comprises a head 78 which extends into the housing 24 where it is engageable with the inner race 44 of the lower bearing 42 at an exterior end face 44B thereof. The exterior end face 44B of the inner race 44 has a greater axial extent than the external end face 46B of the outer race 46. This leaves space for the cage 50 and assures the rotating head 78 will not contact the stationary outer ace 46.

The cap 76 further comprises a rim 80 having an outside diameter substantially equal to that of the housing 22. The rim 80 is disposed slightly axially spaced from the bottom land of the housing 22 to prevent contact between these relatively moving parts. In a similar vein, the outside diameter of the head 78 of the cap 76 is slightly less than the interior diameter of the housing to prevent contact between the cap's head 78 and the housing. An axial bore or hole 82 extends fully through the cap 76. The bore 82 receives the stem 68 of the shaft 62.

Figure 7:
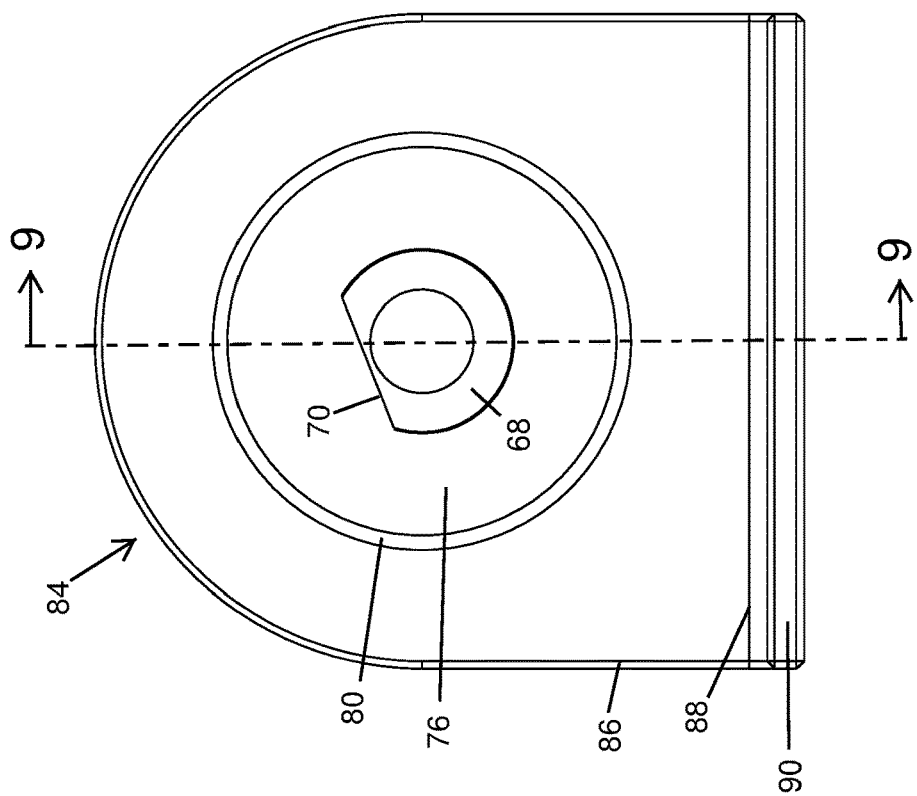
FIG. 7 is a bottom plan view of the caster hub of FIG. 6.
Figure 6:
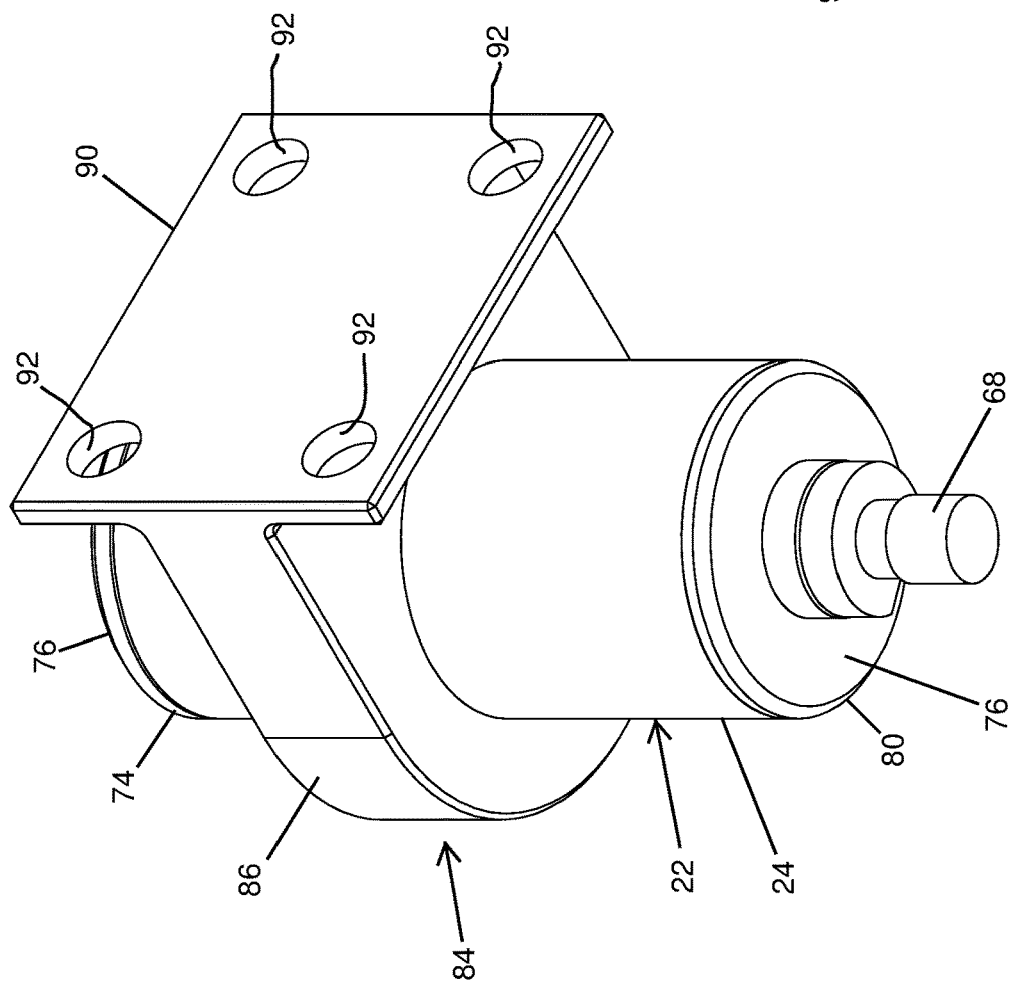
FIG. 6 is an underside perspective view of a second embodiment of the caster hub of the present disclosure.
Figure 9:
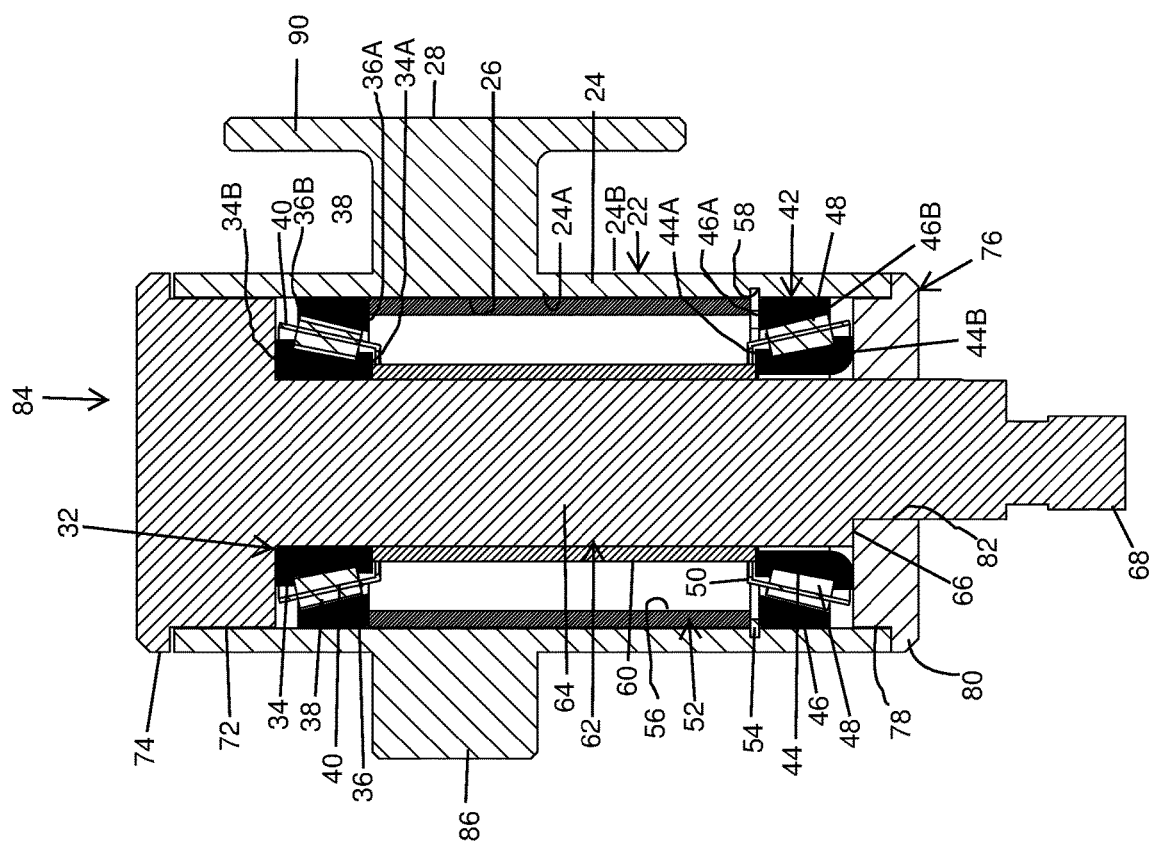
FIG. 9 is a section taken along line 9-9 of FIG. 7.
Figure 8:
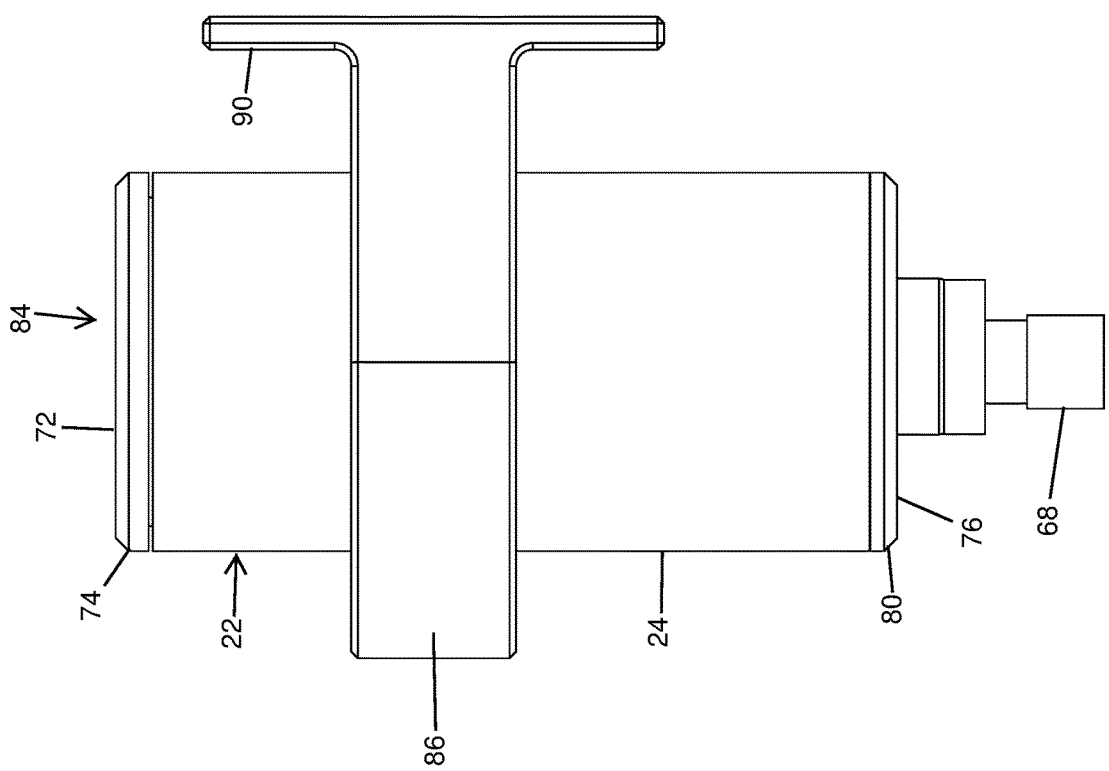
FIG. 8 is a right side elevation view of the caster hub of FIG. 6.
Figure 11:
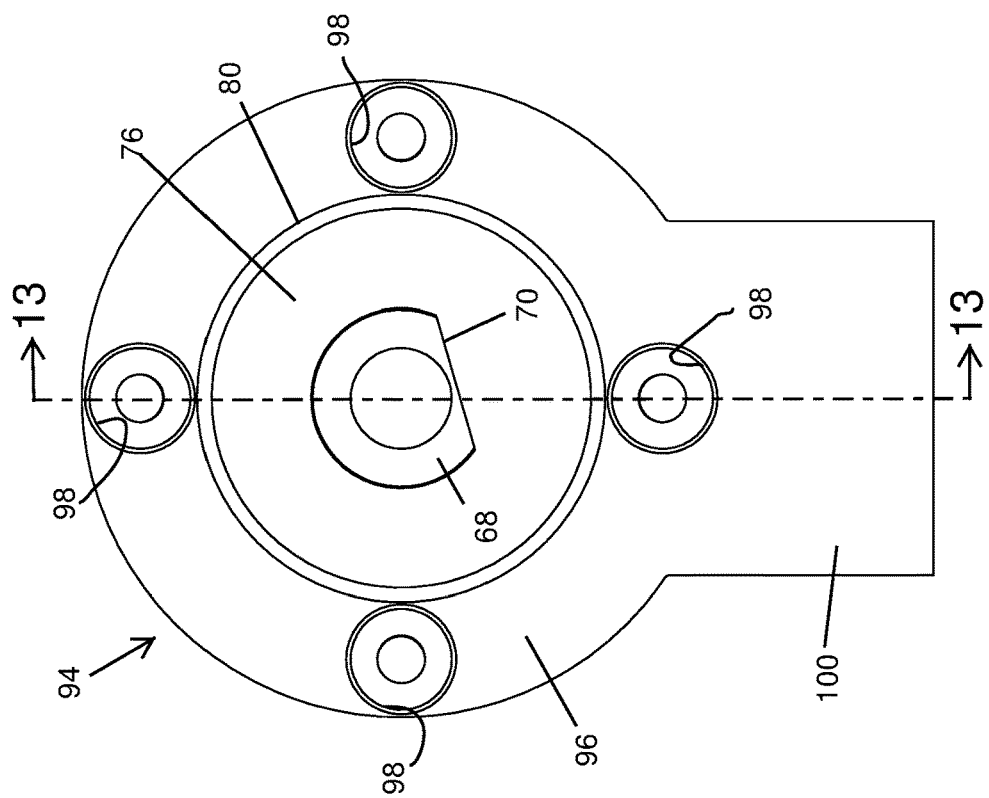
FIG. 11 is a bottom plan view of the caster hub of FIG. 10.
Figure 10:
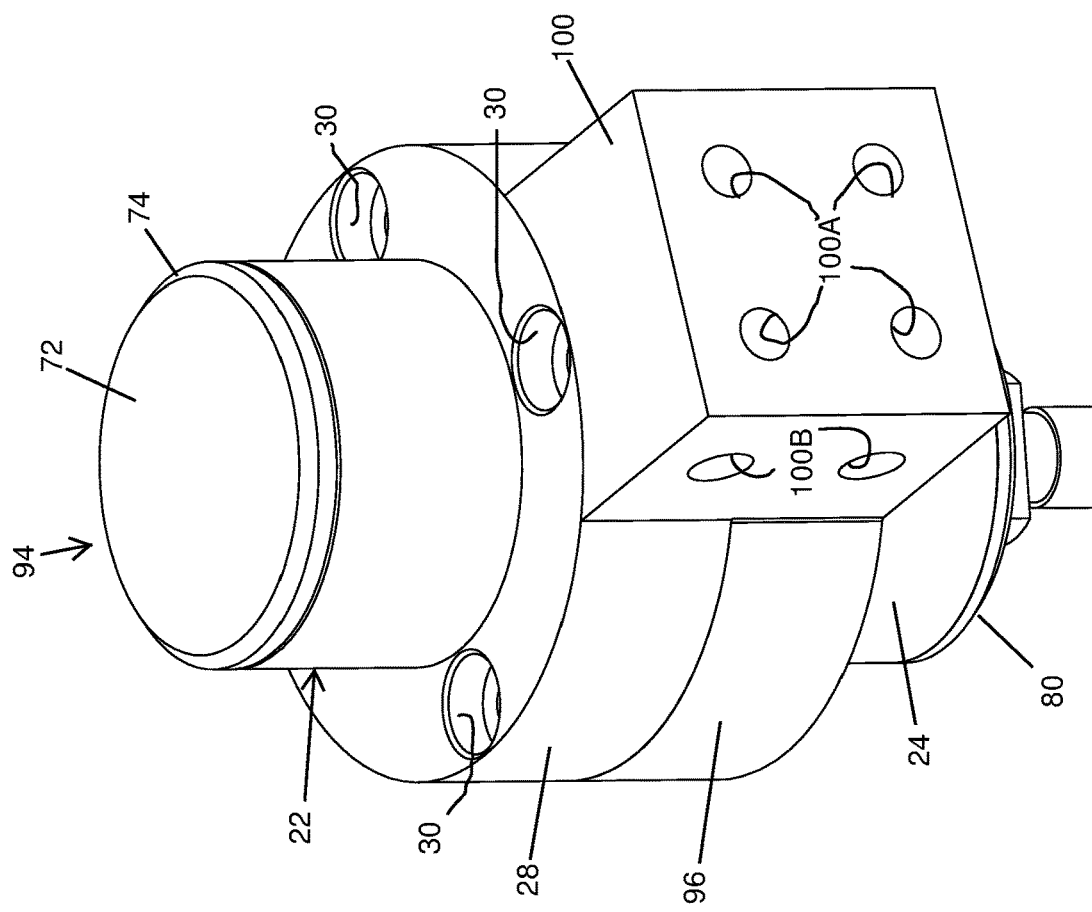
FIG. 10 is a rear perspective view of a third embodiment of the caster hub of the present disclosure.
Figure 13:
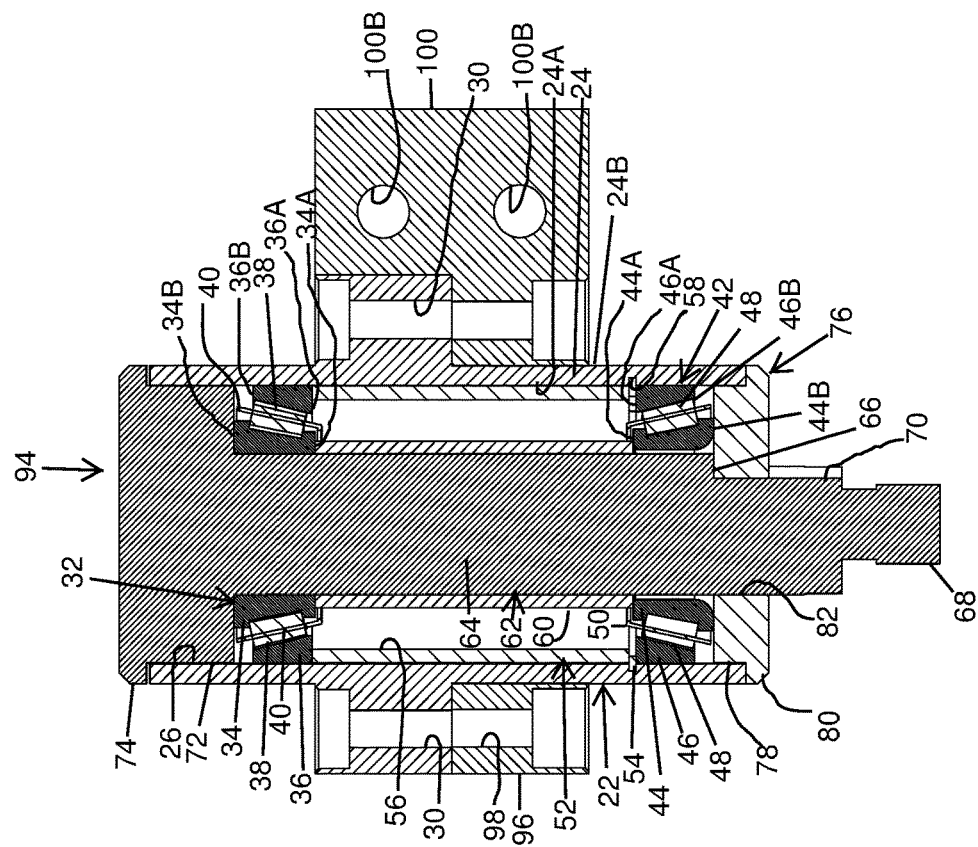
FIG. 13 is a section taken along line 13-13 of FIG. 11.
Figure 12:
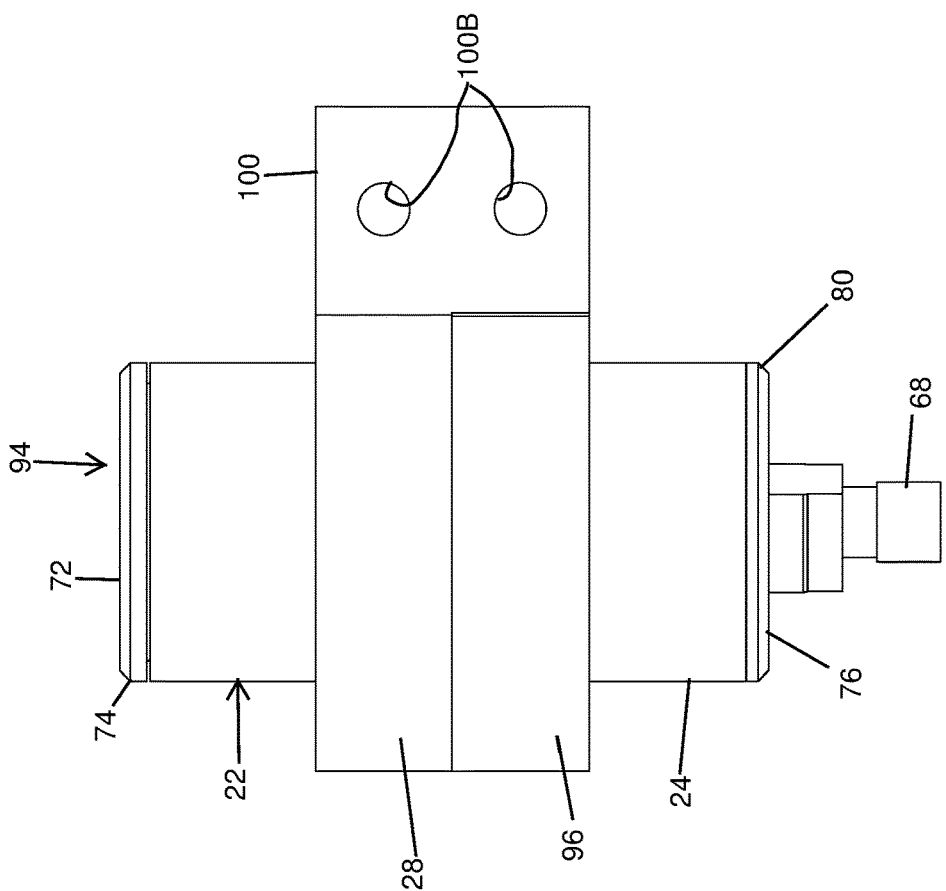
FIG. 12 is a right side elevation view of the caster hub of FIG. 10.
Figure 14:
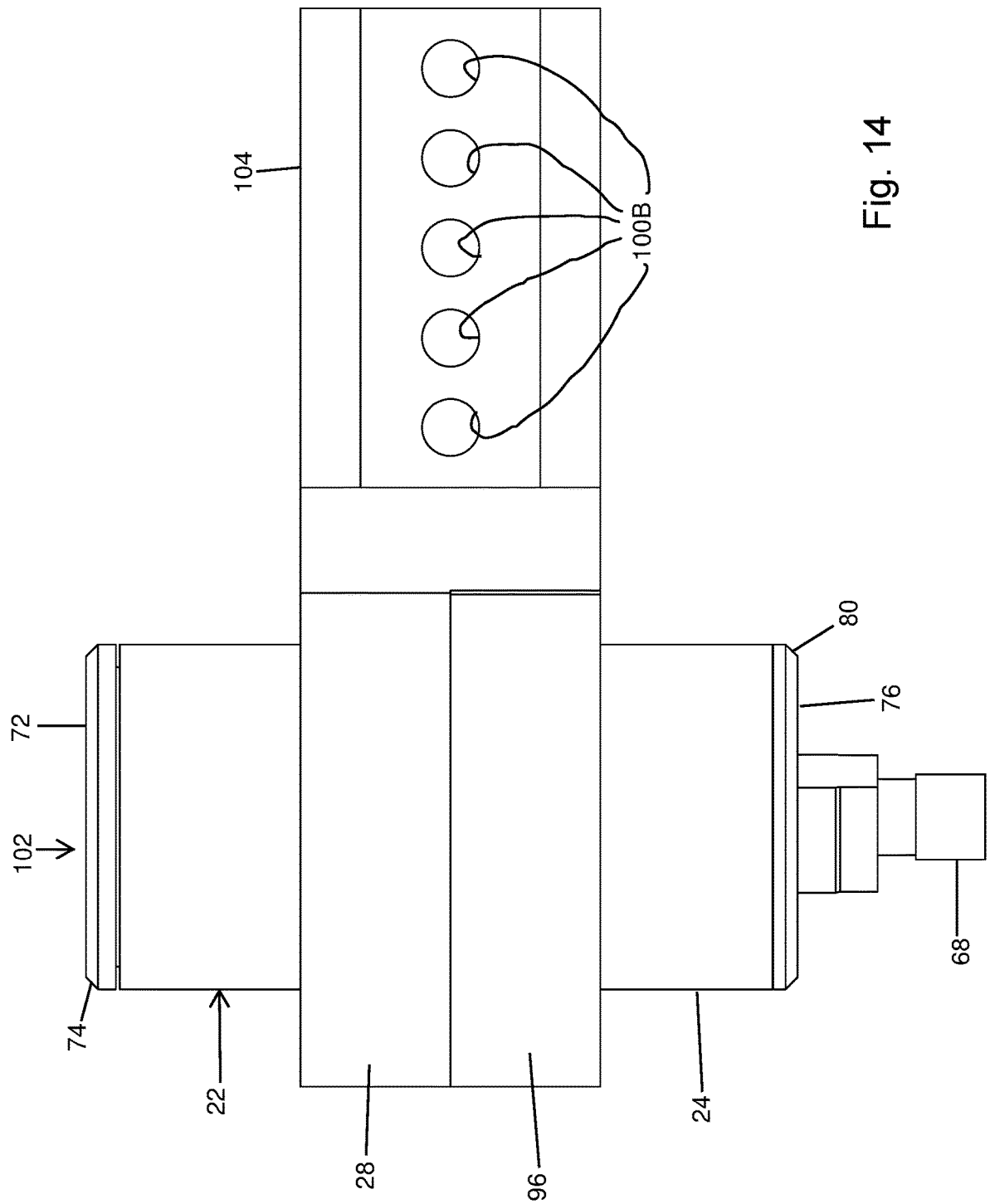
FIG. 14 is a right side elevation view of a fourth embodiment of the caster hub of the present disclosure.
Figure 15:
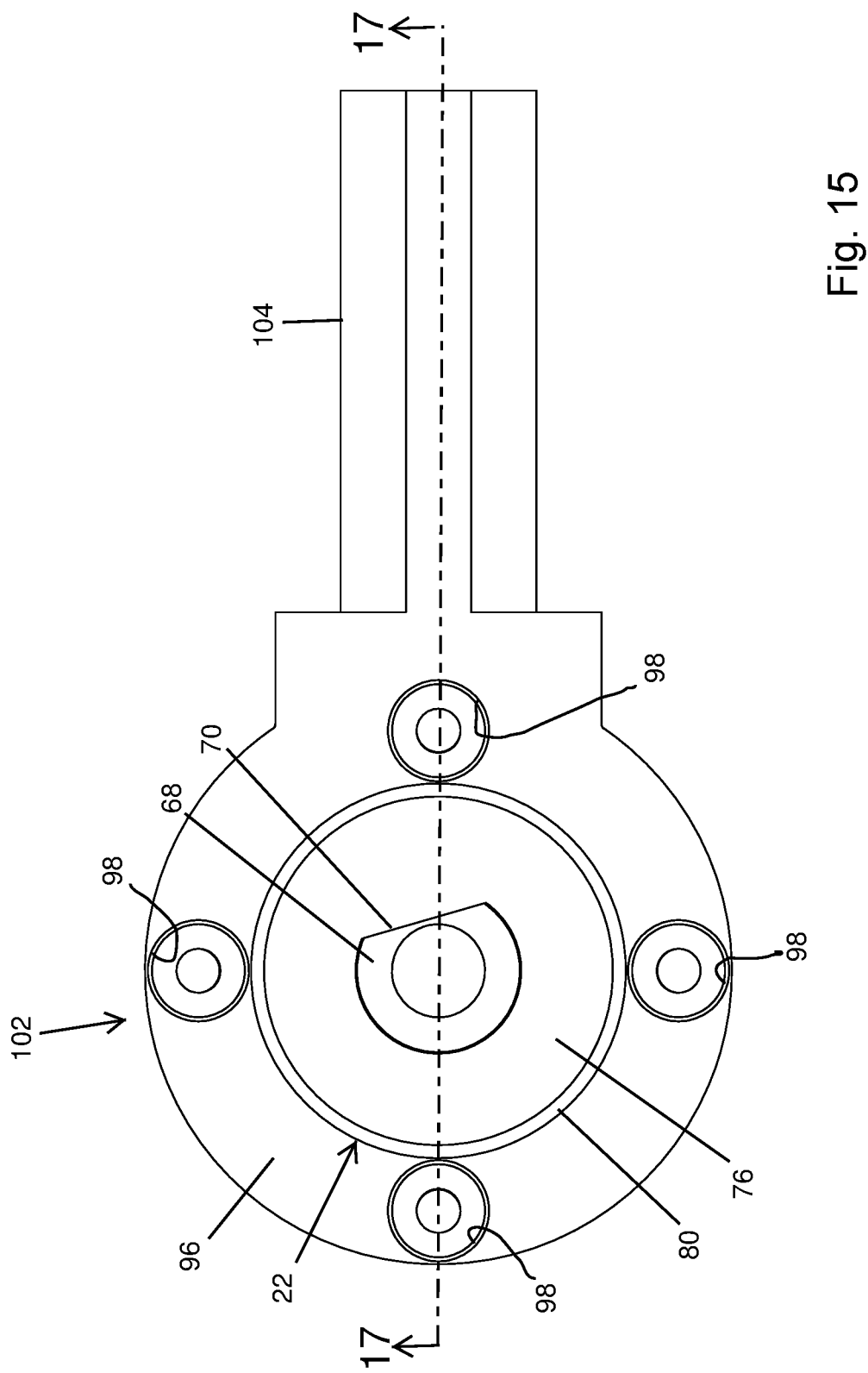
FIG. 15 is a bottom plan view of the caster hub of FIG. 14.
Figure 16:
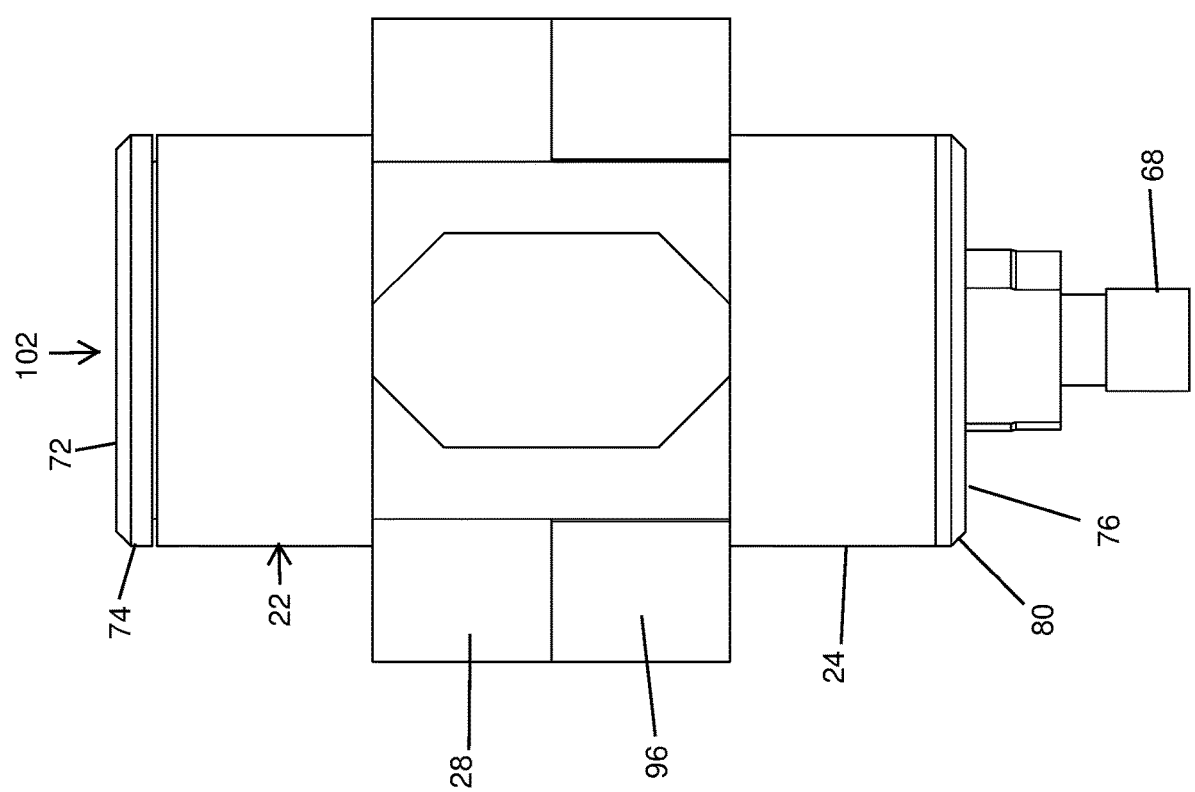
FIG. 16 is a front elevation view of the caster hub of FIG. 14.
Figure 17:
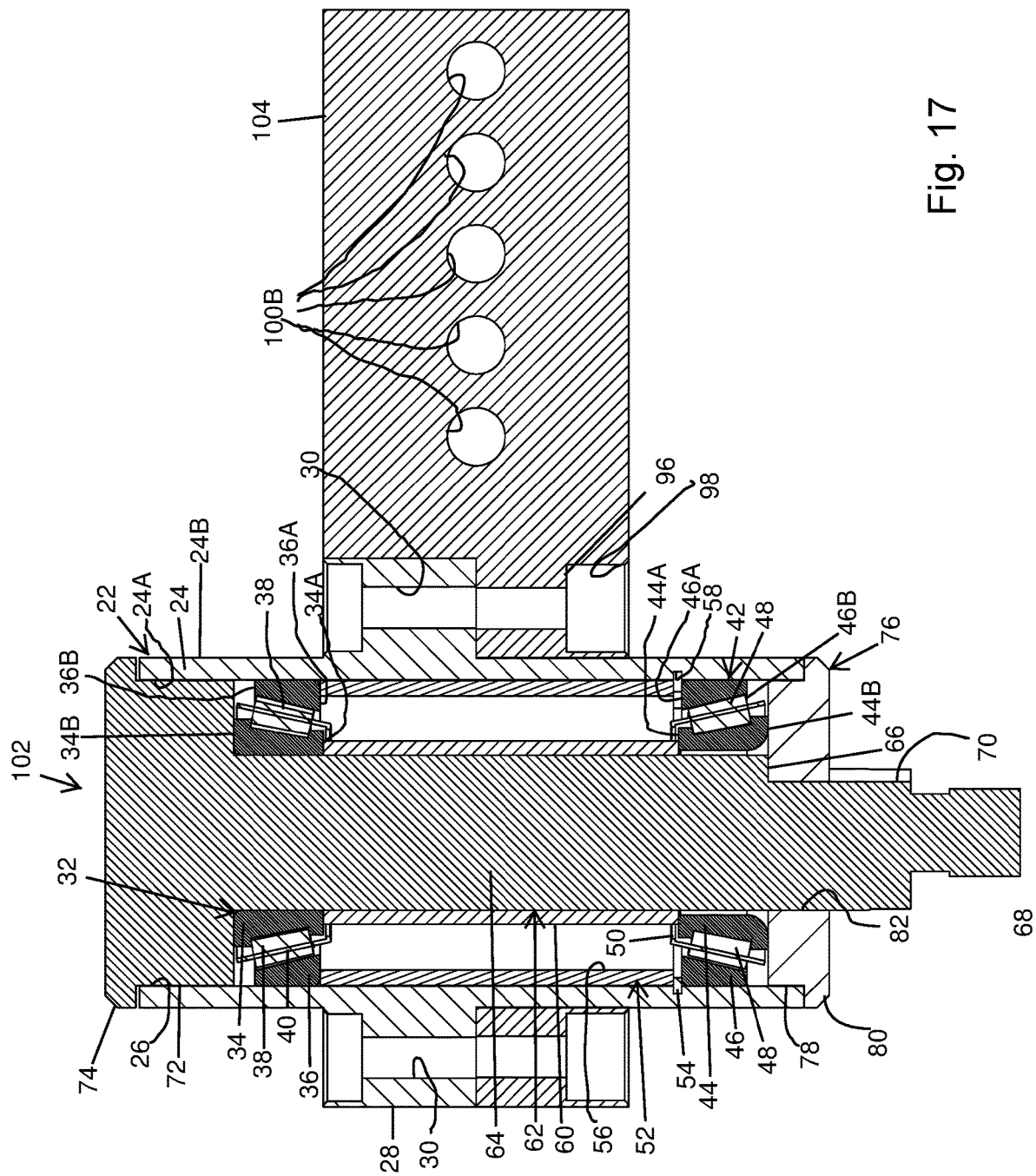
FIG. 17 is a section taken along line 17-17 of FIG. 15.
Figure 19:
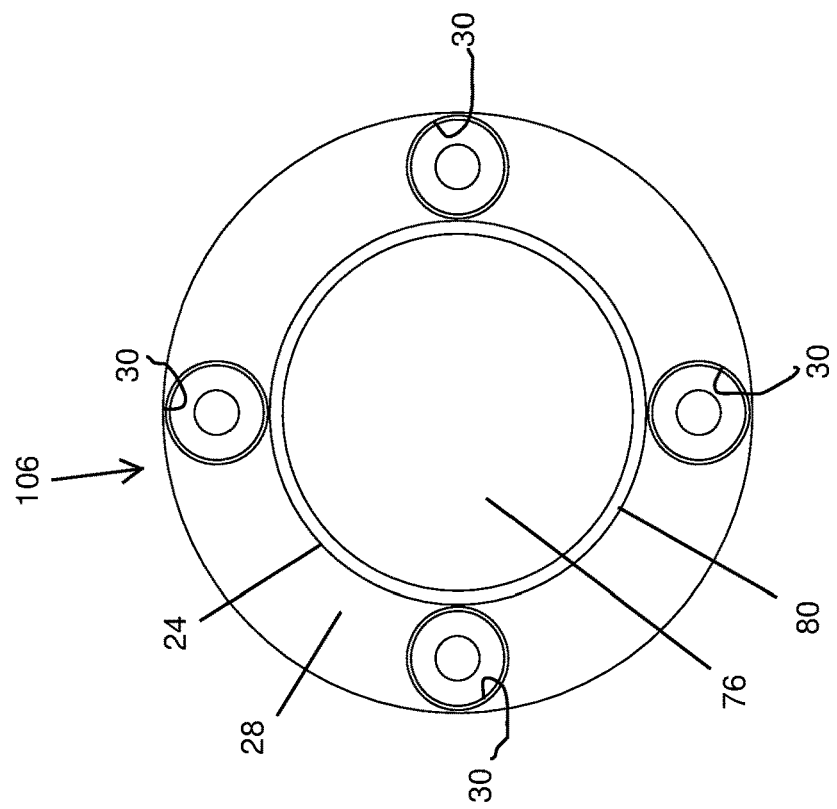
FIG. 19 is a top plan view of the caster hub of FIG. 18.
Figure 18:
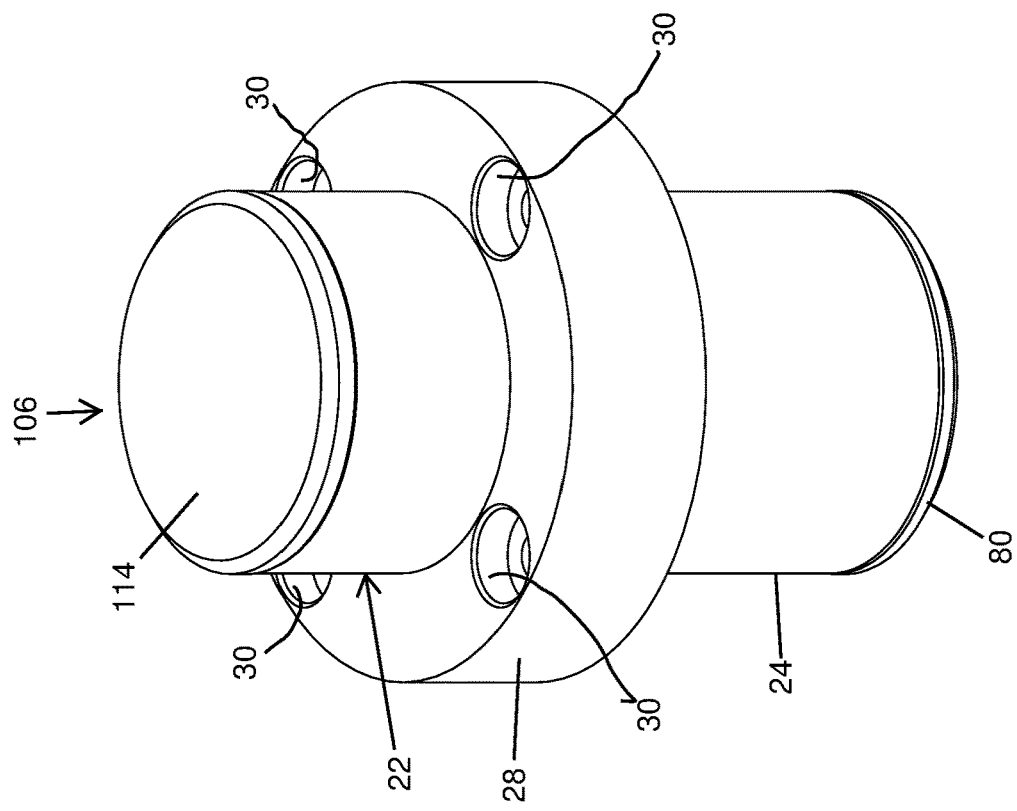
FIG. 18 is a perspective view of a fifth embodiment of the caster hub of the present disclosure.
Figure 23:
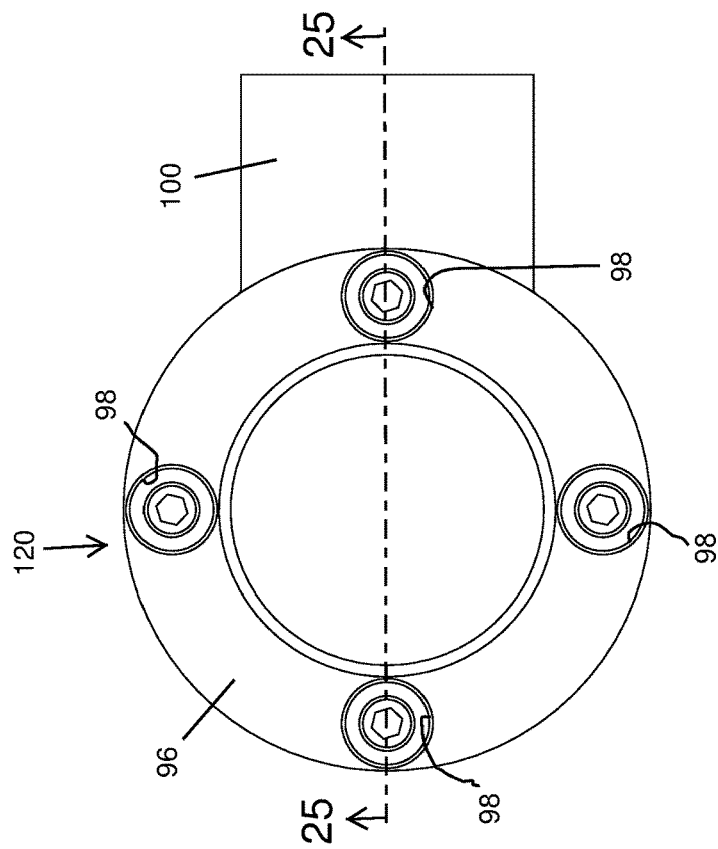
FIG. 23 is a top plan view of the caster hub of FIG. 23.
Figure 22:
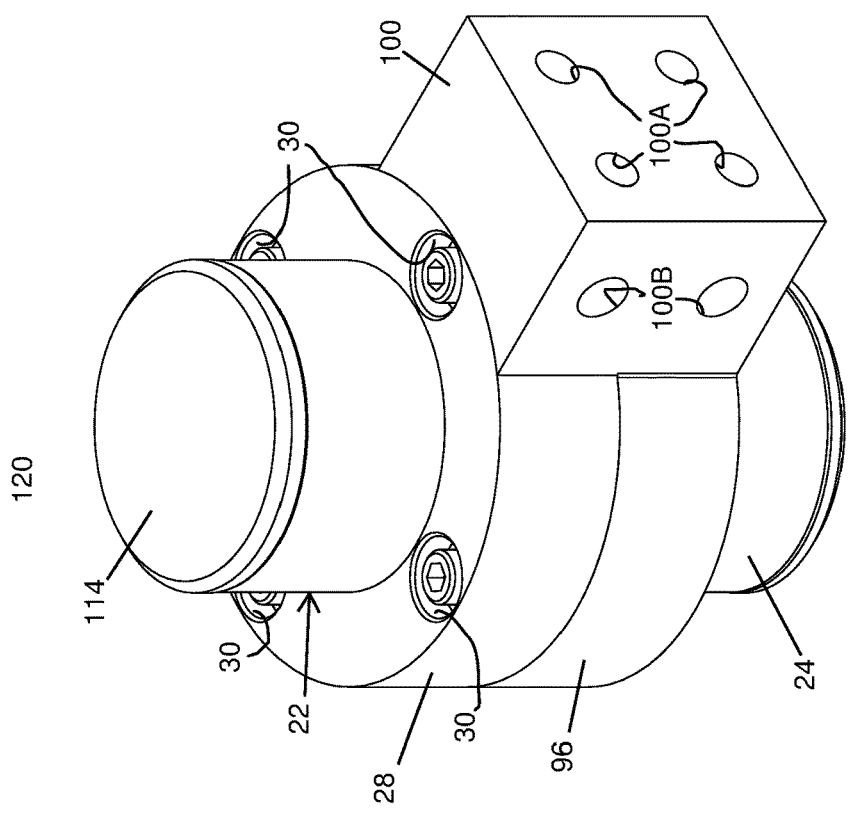
FIG. 22 is a rear perspective view of a sixth embodiment of the caster hub of the present disclosure.
Figure 24:
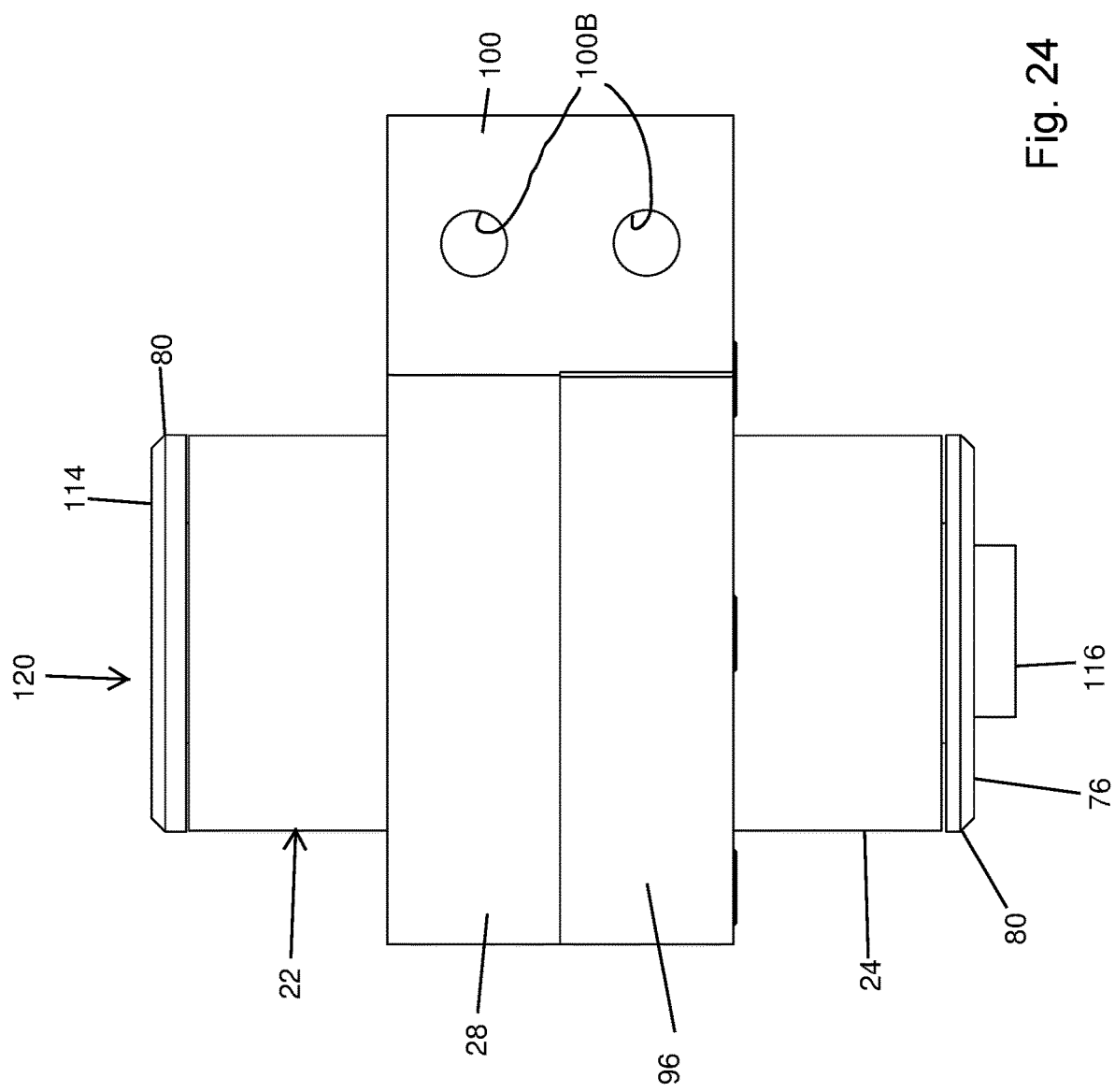
FIG. 24 is a right side elevation view of the caster hub of FIG. 22.
Figure 25:
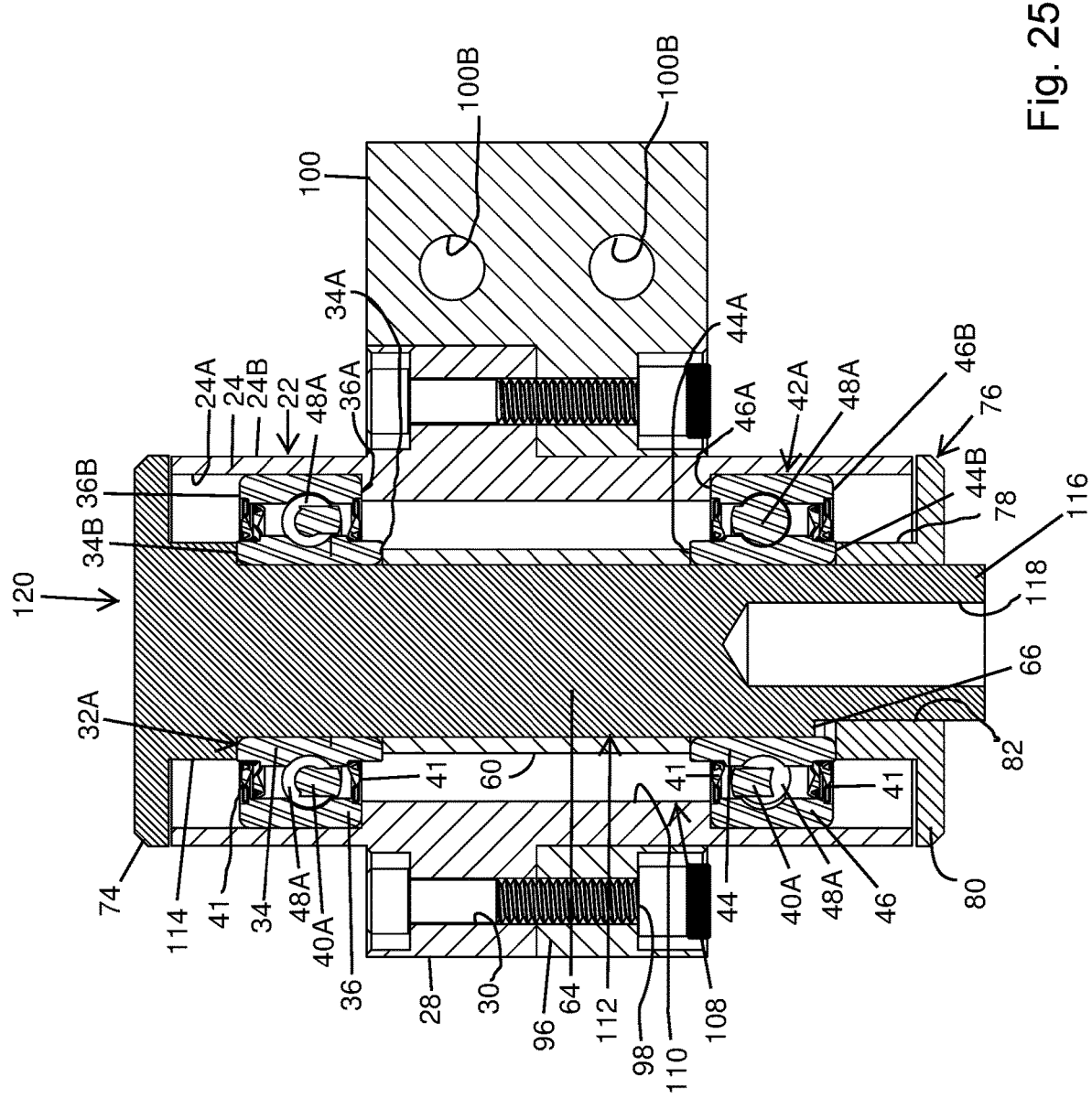
FIG. 25 is a section taken along line 25-25 of FIG. 23.
Figure 26:
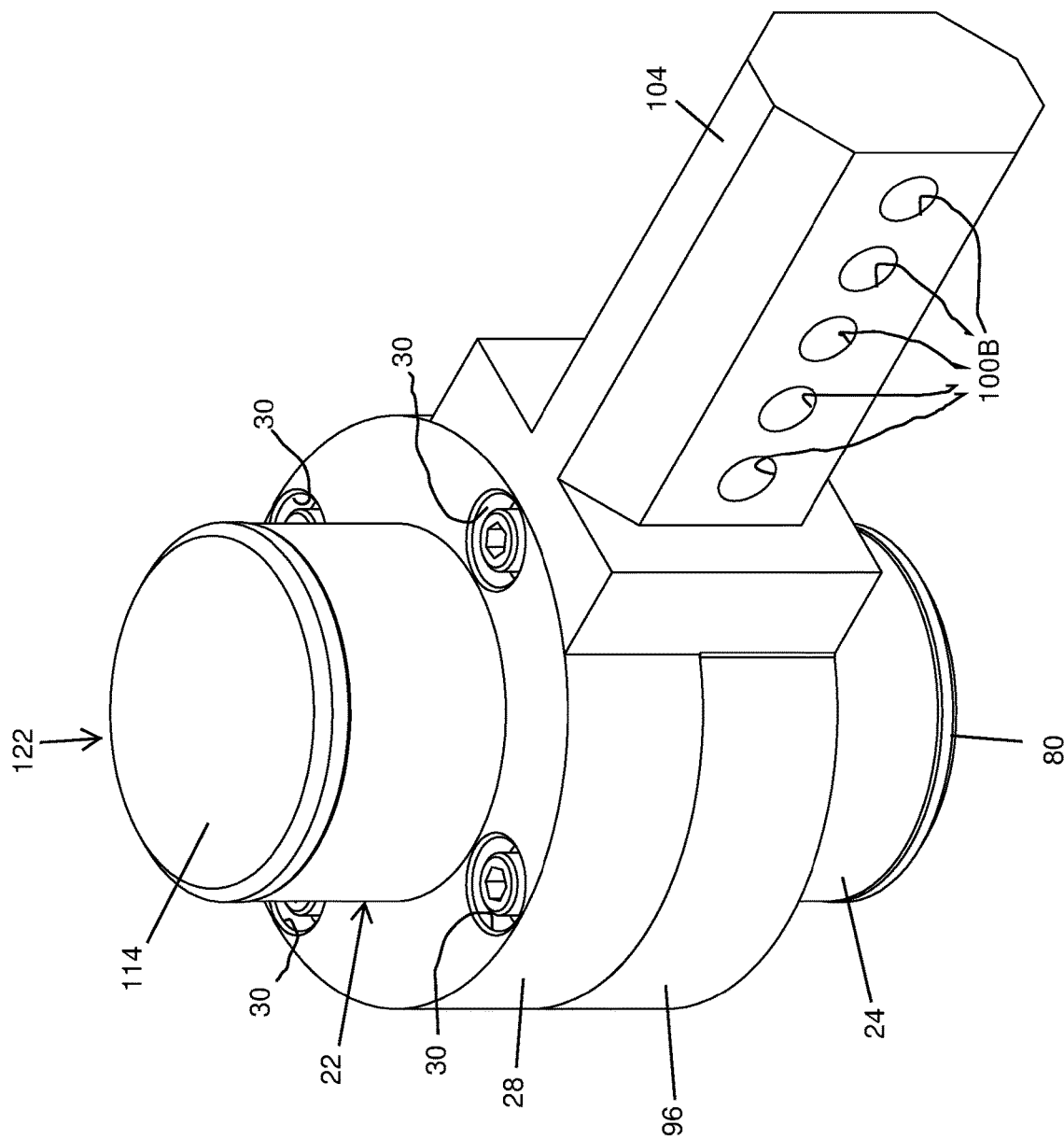
FIG. 26 is a rear perspective view of a seventh embodiment of the caster hub of the present disclosure.
Figure 27:
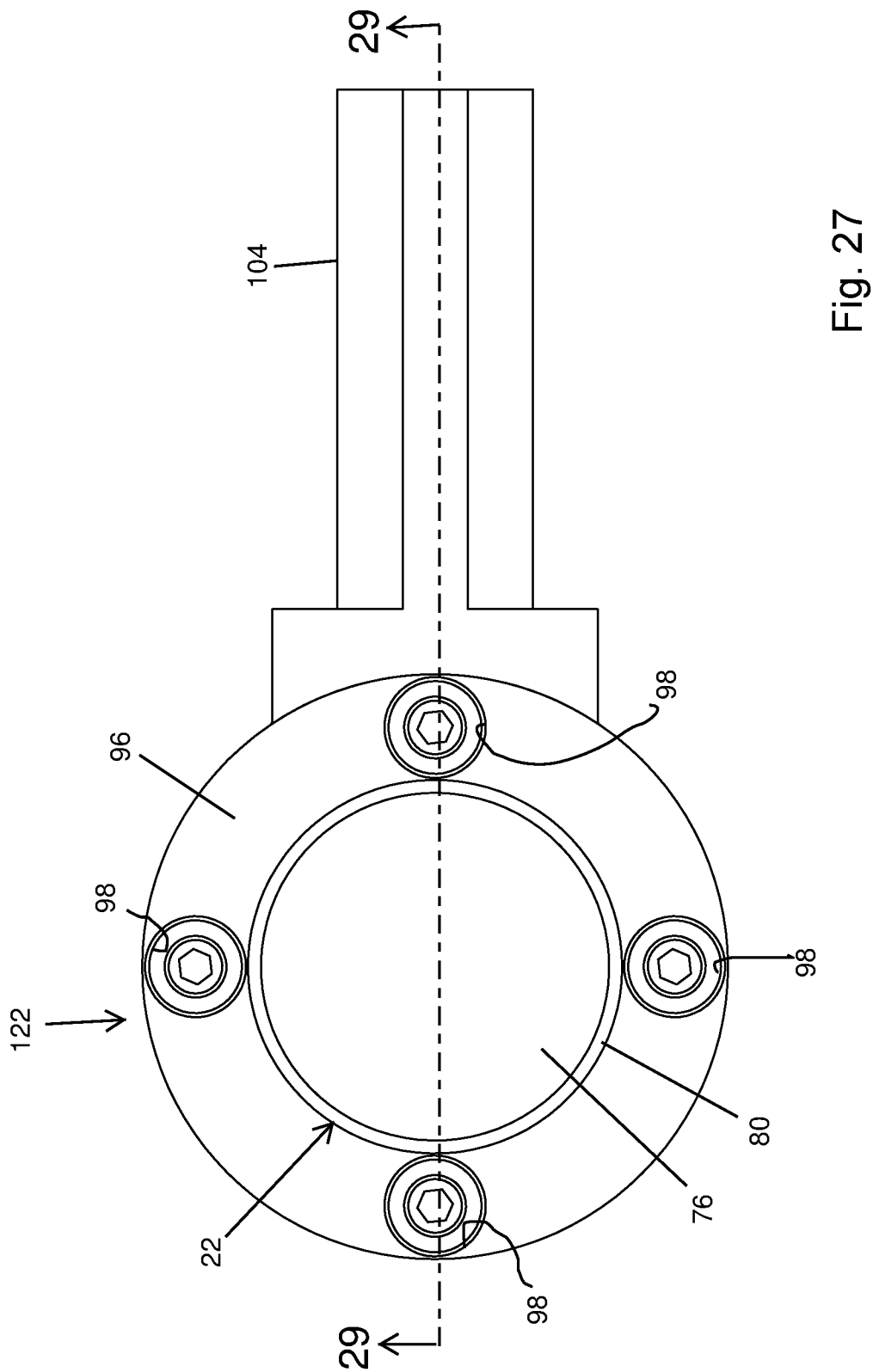
FIG. 27 is a top plan view of the caster hub of FIG. 26.
Figure 28:
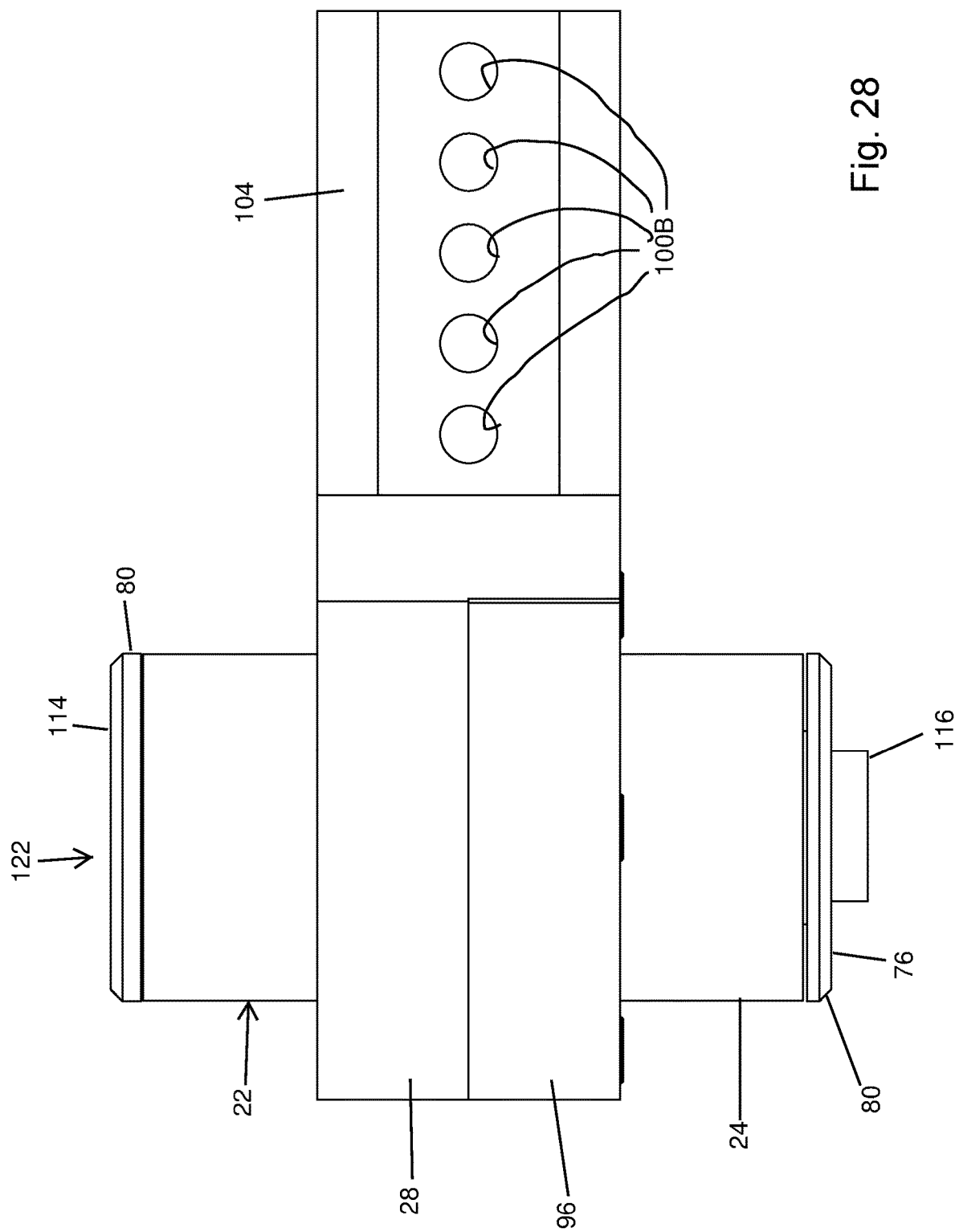
FIG. 28 is a right side elevation view of the caster hub of FIG. 26.
Figure 29:
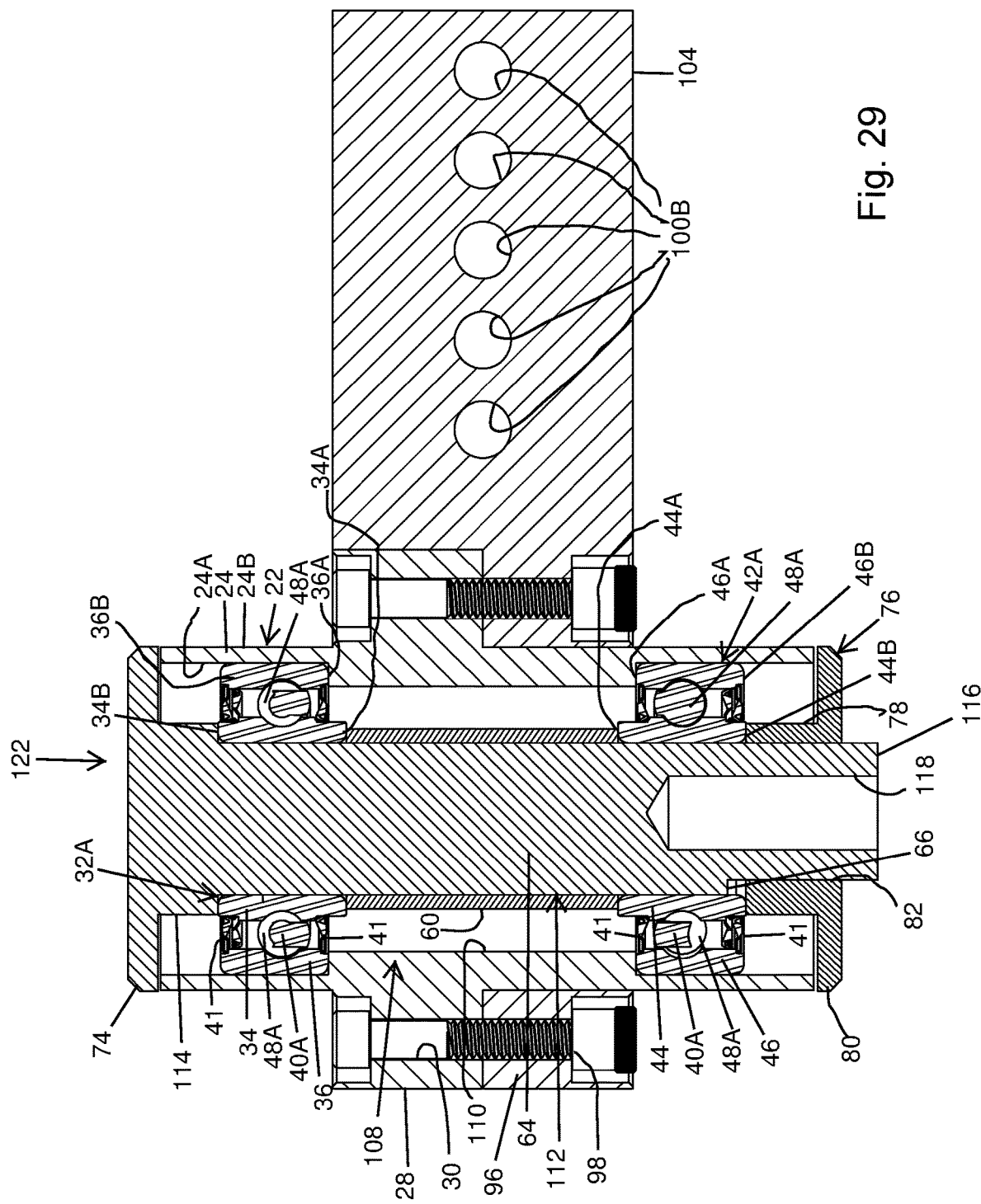
FIG. 29 is a section taken along line 29-29 of FIG. 27.
Figure 30:
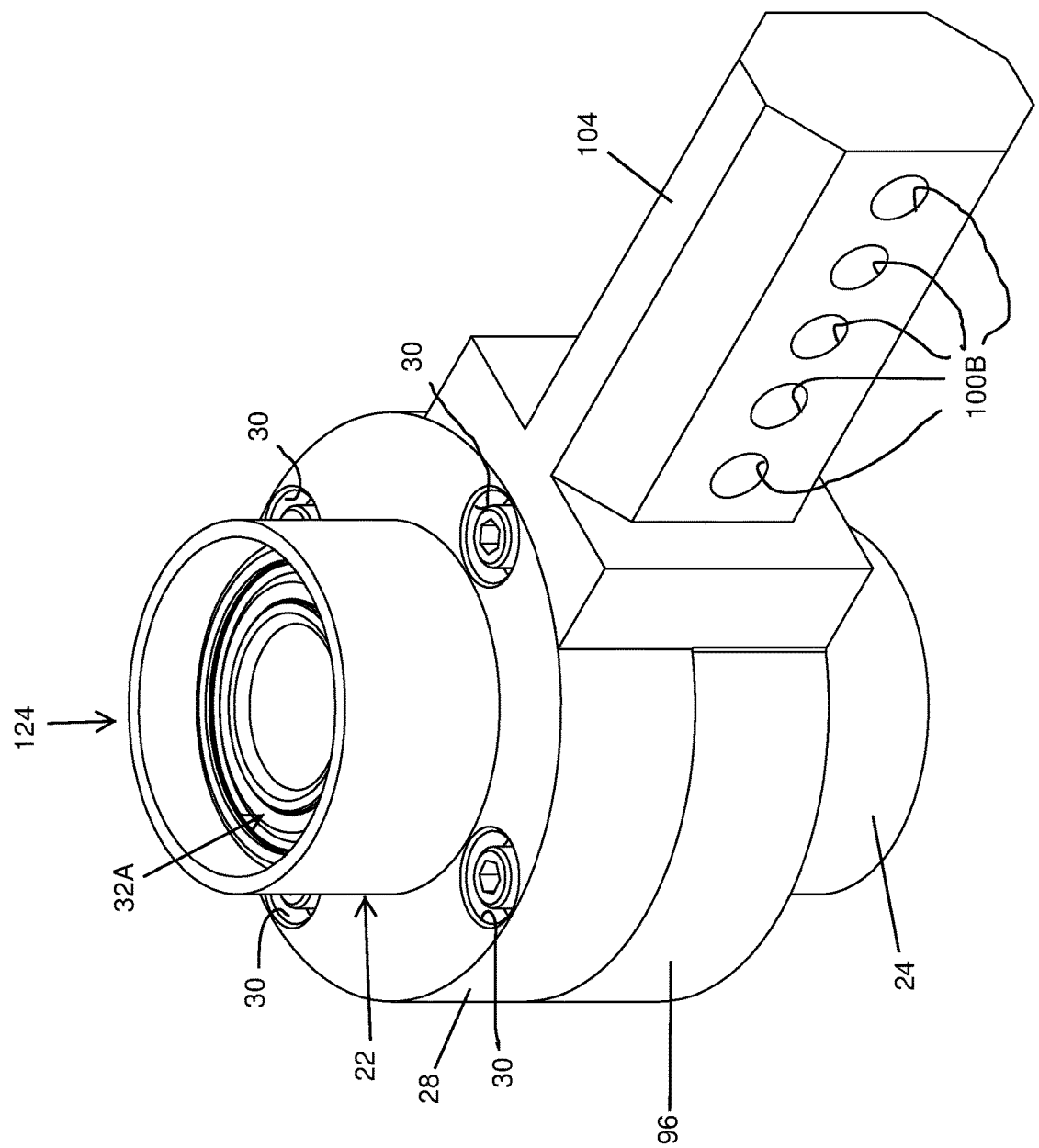
FIG. 30 is a rear perspective view of an eighth embodiment of the caster hub of the present disclosure.
Figure 31:
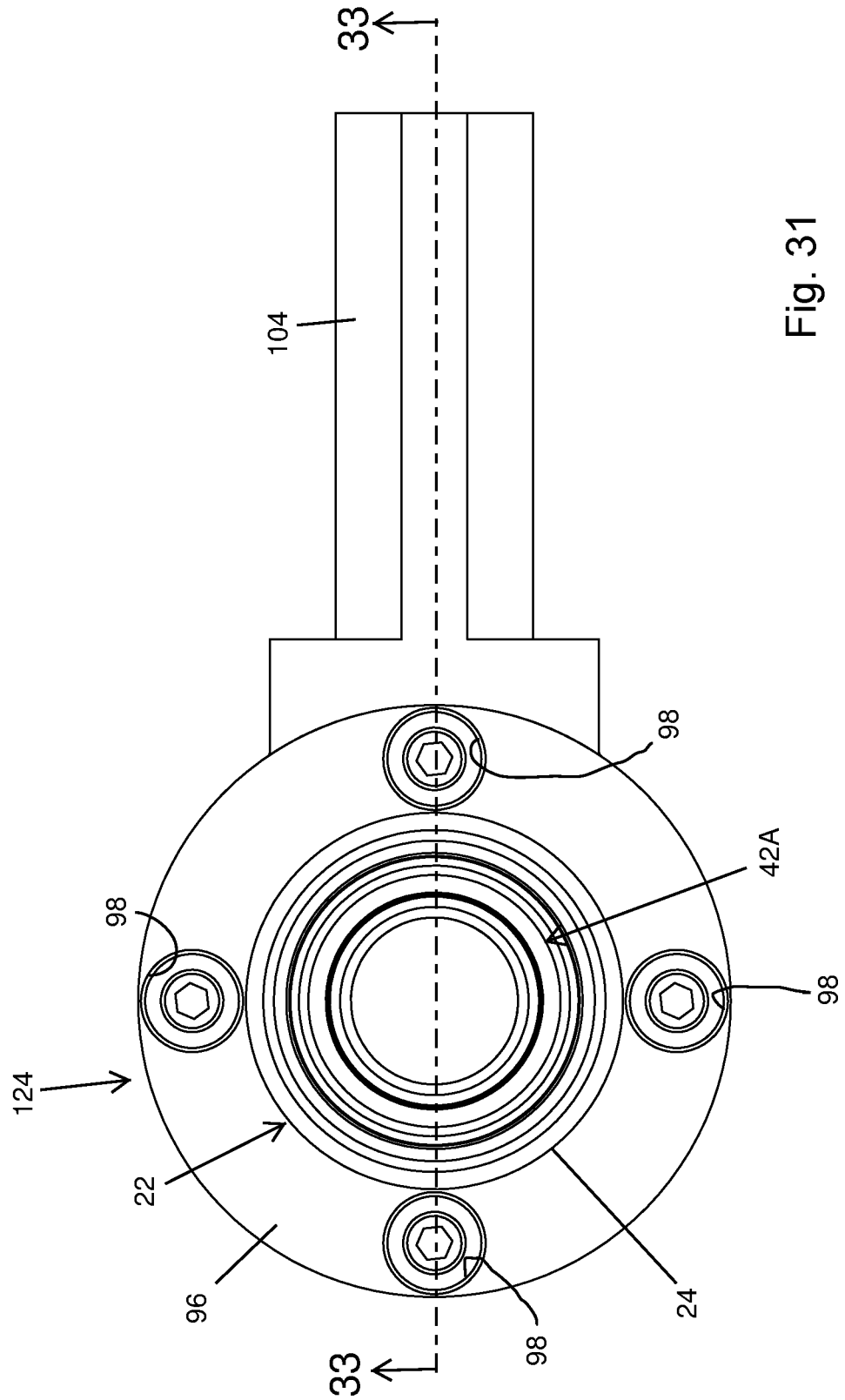
FIG. 31 is a top plan view of the caster hub of FIG. 30.
Figure 32:
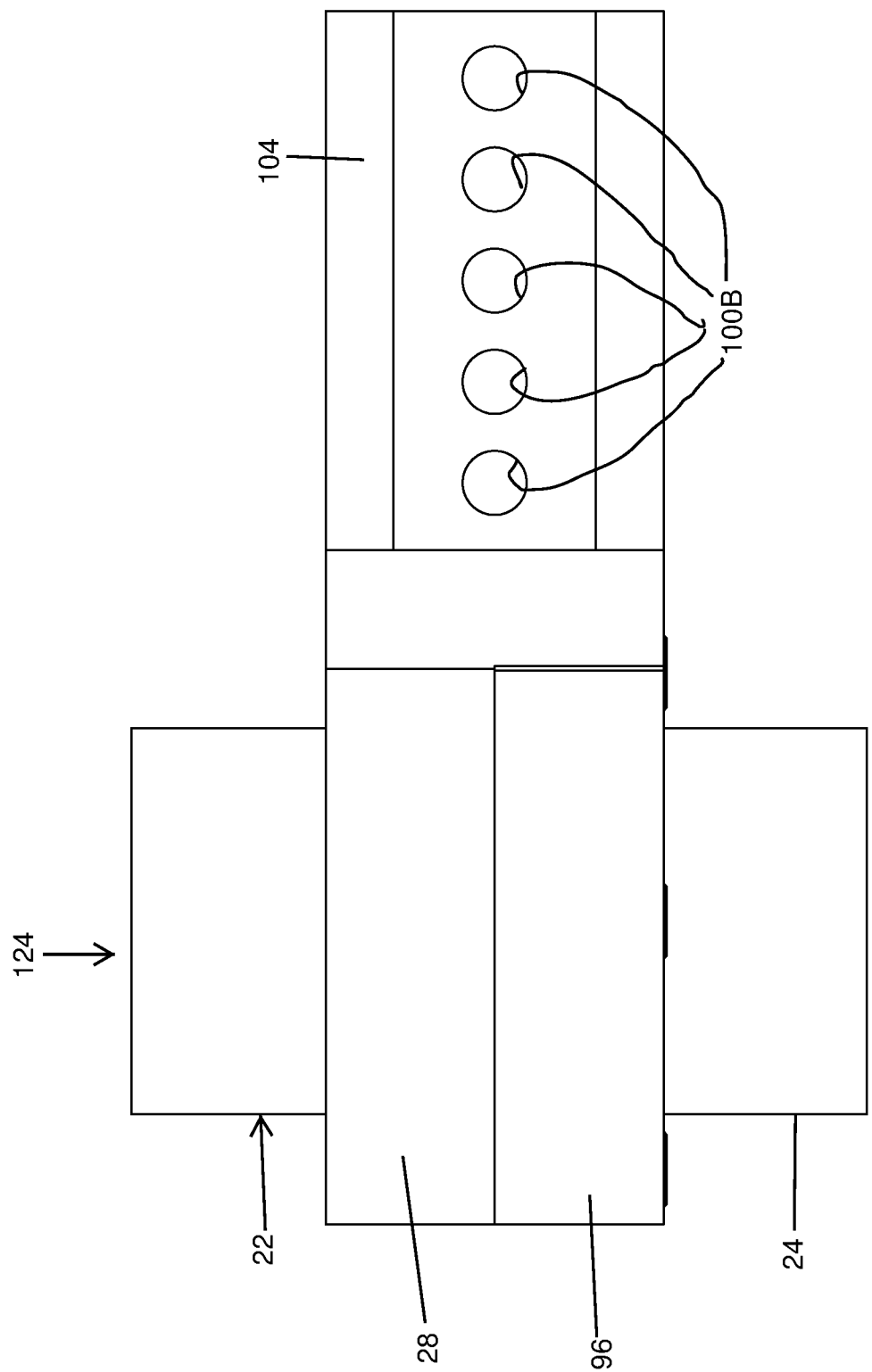
FIG. 32 is a right side elevation view of the caster hub of FIG. 30.
Figure 33:
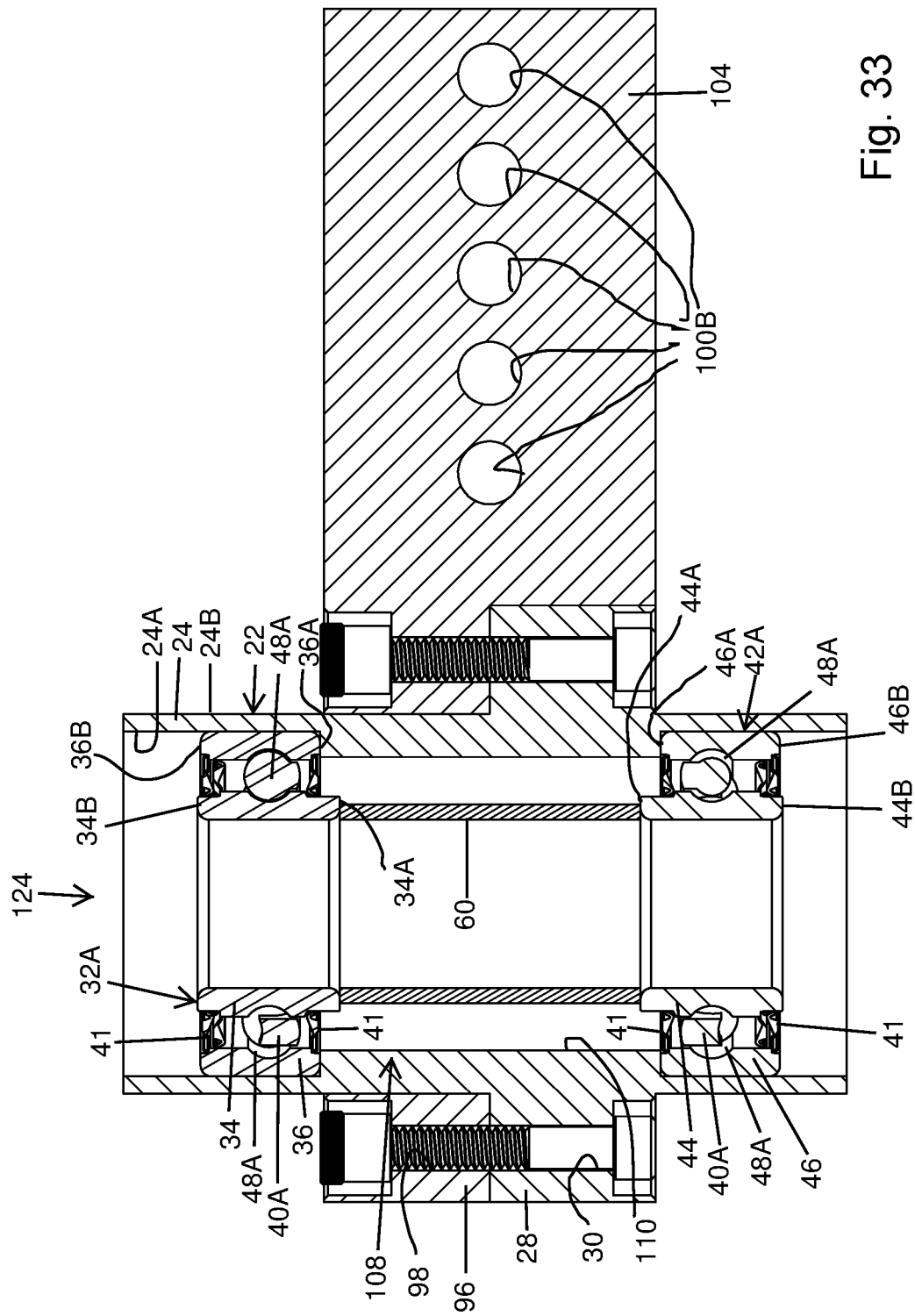
FIG. 33 is a section taken along line 33-33 of FIG. 31.

A second embodiment of a caster hub 84 is shown in FIGS. 6-9. Many of the component parts of this embodiment, as well as the next two embodiments, are the same as those of FIGS. 2-5. Common reference numerals are applied to these equivalent parts so their description need not be repeated. Where the second through fourth embodiments differ from that of FIGS. 2-5 is in the components provided for connecting the caster hub to the chassis of a movable apparatus. Multiple attachment elements are provided to afford maximum flexibility in incorporating the caster hubs of the present disclosure into various arrangements for a chassis and frame pieces. Here in FIGS. 6-9 a different flange 86 is provided compared to flange 28. As best seen in FIG. 7 the flange 86 surrounds the housing 22 but at one side it extends outwardly to a straight edge 88. A mounting plate 90 is attached to the straight edge. The mounting plate is generally normal to the plane of the flange 86. A plurality of bolt holes 92 (FIG. 6) extend through the mounting plate.

A third embodiment of a caster hub 94 is shown in FIGS. 10-13. The caster hub 94 is essentially the same as the hub 20 of FIGS. 2-5 with the addition of an annular collar 96 having an aperture therethrough. The aperture is sized to receive the wall 24 of the housing 22 therein, but not the flange 28 such that the flange 28 is engageable with the collar 96. The flange 28 and collar 96 have aligned bolt holes 98 for receiving bolts (not shown) therethrough that will connect the collar and flange together. There is an extension 100 attached to the collar 96 and extending radially therefrom. The extension 100 may have radial bolt holes 100A and tangential bolt holes 100B formed therein.

A fourth embodiment of a caster hub 102 is shown in FIGS. 14-17. The caster hub 102 is essentially the same as the hub 94 of FIGS. 10-13 with the substitution of an elongated extension 104 for the extension 100. Extension 104 has only tangential bolt holes 100B.

The next four embodiments differ from the first four embodiments in that they have an alternate version of the seat. That is, the seat is disposed in the housing's bore 26 and is connected to the internal surface 24A of the wall 24 between the first and second bearings 32 and 40. The seat is engageable with the outer races 36 and 46 of the bearings at facing interior end faces 36A, 42A of the bearings. In the fifth embodiment of the caster hub 106 of FIGS. 18-21, and in the following sixth through eighth embodiments, the seat is shown generally at 108 and is defined by a shoulder 110 which is integrally formed on the internal surface 24A of the housing wall 24. The shoulder 110 has its upper end engageable with the outer ace 36 of the first bearing 32 at the interior end face 36A thereof. The shoulder 110 has its second, lower end abutting the outer race 46 of the second bearing 42 at the interior end face 46A thereof.

The castor hub 106 of FIGS. 18-21 also has an alternate form of a shaft 112. It is similar to shaft 62 except that the outer diameter of the head 114 is smaller, the axial length of the stem 116 is shorter and there is a bore 118 in the stem. Also, the stem 116 does not have a flat. In other respects the castor hub 106 is similar to the first embodiment 20 of FIGS. 2-5, including having the same flange 28.

The castor hub 108 of FIGS. 16-21 also has an alternate form of bearings 32A and 42A. Here the roller element is a ball 48A held by a cage 40A. The bearings may further include seals 41. Each seal 41 comprises an internal seal that is staked to the inner ring and includes a resilient seal that engages the outer ring, and an external seal that is staked to the outer ring and includes a resilient seal that engages the inner ring.

In the sixth embodiment of the caster hub 120 of FIGS. 22-25, the alternate seat 108 and alternate shaft 112 are used. These are paired with the annular collar 96 and extension 100 of FIGS. 10-13.

In the seventh embodiment of the caster hub 122 of FIGS. 26-29, the alternate seat 108 and alternate shaft 112 are used. These are paired with the annular collar 96 and elongated extension 104 of FIGS. 14-17.

The eighth embodiment of the caster hub 124 of FIGS. 30-33, the same housing and bearing structure as caster hub 122 is used, but the shaft 112 is omitted. This arrangement allows a manufacturer to install a shaft of a shape of its own choosing.

In keeping with another aspect of the disclosure, the caster hub may be provided with an exterior seal on its top surface. With reference to FIG. 34, the upper end of the caster hub 126 has a head 128 that is received internally of the housing 130 to seal the upper end. A cap seal 132 is provided to the upper, exterior surface of the head 128, preferably in the form of a rubber or polymeric material that may be coated onto the upper surface. The cap seal provides protection for the upper surface of the caster hub 126 in the event of water pooling on the upper surface.

Seals may also be provided on the interior of the caster hub to protect the interior components from dirt and moisture. With reference to FIG. 35, an annular seal 134 is provided that is press-fit onto an interior shoulder 136 of the lower cap 138. As illustrated, the annular seal 134 comprises a stamped metal sleeve portion 140, preferably made of steel, having an inside diameter sized to be received on the interior shoulder 136, and a resilient seal member 142 secured to the sleeve 140 that seals against the internal surface of the housing of the caster hub. As illustrated, the seal member 142 is a triple lip sealing member made of a resilient material, such as nitrile rubber, with the lips extending radially outwardly for engagement with the interior surface of the housing.

Figure 36:
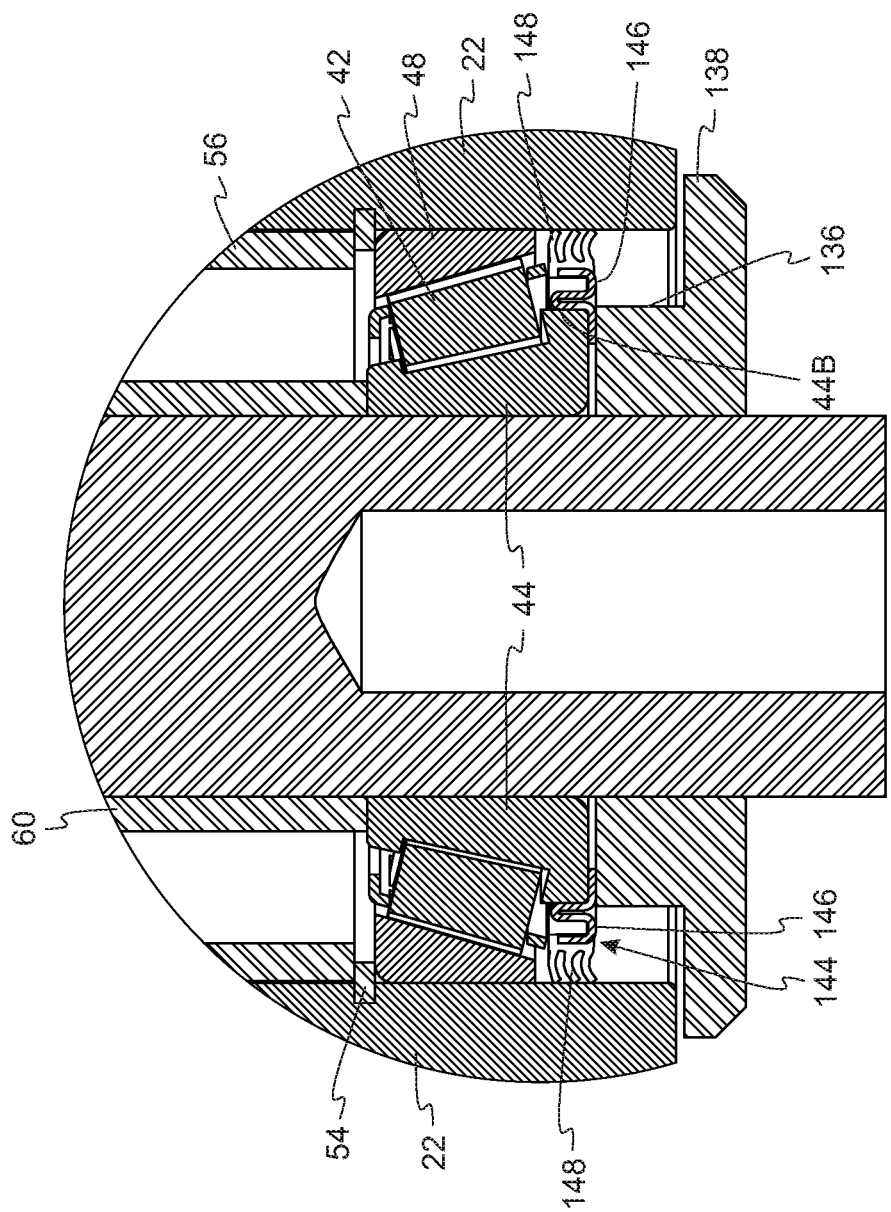
FIG. 36 is an enlarged cross sectional view of a portion of a caster hub according to the present disclosure showing a bearing assembly with an internal seal press-fit onto the bearing inner ring.

Alternatively, the inner seal may be associated with the bearing assembly for the caster hub. With reference to FIG. 36, an annular seal 144 is provided that is press-fit onto the bearing assembly. The annular seal 144 comprises a stamped metal sleeve portion 146 that has an inside diameter sized to be received on the exterior face 44B of the inner bearing race 44, and a resilient seal member 148 secured to the sleeve 146 that seals against the internal surface of the housing of the caster hub. As illustrated, the seal member 148 is a triple lip sealing member, like the seal member 142 described above.

It should be understood that various changes and modifications to the presently preferred embodiments described herein will be apparent to those skilled in the art. Such changes and modification can be made without departing from the spirit and scope of the invention disclosed herein.

The invention claimed is:

1. A caster hub, comprising:
   a housing having a wall with internal and external surfaces and an axial bore defined by the wall;
   first and second bearings disposed coaxially in the bore of the housing, each bearing having a cylindrical inner race and a cylindrical outer race with the inner and outer races separated by rolling elements, the inner and outer races defining interior and exterior radial end faces of the first and second bearings;
   a seat disposed in the bore and connected to the internal surface of the wall between the first and second bearings, the seat being engageable with the outer races of the bearings at the confronting interior end faces of the bearings;
   an inner spacer disposed in the bore between the first and second bearings, the inner spacer being engageable with the inner races of the bearings at the confronting interior end faces of the bearings; and
   wherein the internal surface of the wall has a groove formed therein and the seat comprises a snap ring and an outer spacer, the snap ring being held in the groove and the outer spacer having one end being engageable with an outer race of one of the bearings at the interior end face thereof, the outer spacer having a second end abutting one side of the snap ring, the other side of the snap ring being engageable with an outer race of one of the bearings at the interior end face thereof.

2. The caster hub of claim 1 wherein the seat comprises a shoulder integrally formed on the internal surface of the wall.

3. The caster hub of claim 1 further comprising a shaft mounted for rotation in the first and second bearings.

4. The caster hub of claim 3 wherein the shaft has a shank and a head formed at one end of the shank, the head having a larger outside diameter than the shank, the shank being mounted for rotation in the first and second bearings and the head being engageable with the inner race of one of the bearings at an exterior end face thereof.

5. The caster hub of claim 4 wherein the exterior end face of the inner race engaged with the head has a greater axial extent than that of the outer race.

6. The caster hub of claim 4 further comprising a rim attached to the head and having an outside diameter substantially equal to that of the housing.

7. The caster hub of claim 3 further comprising a cap attached to the shaft for rotation therewith.

8. The caster hub of claim 7 wherein the cap comprises a head, the head extending into the housing where the head is engageable with the inner race of one of the bearings at an exterior end face thereof.

9. The caster hub of claim 8 wherein the cap further comprises a rim having an outside diameter substantially equal to that of the housing.

10. The caster hub of claim 7 wherein the cap comprises a head, the head extending into the housing where the head is engageable with the inner race of one of the bearings at an exterior end face thereof, the exterior end face of the inner race having a greater axial extent than the external end face of the outer race.

11. The caster hub of claim 3 further comprising a cap having an aperture with an annular shoulder through which the shaft extends and an annular seal member received on the shoulder and including a resilient seal that engages the internal surface of the housing.

12. The caster hub of claim 1 further comprising a flange attached to the external surface of the wall and extending radially therefrom.

13. The caster hub of claim 12 further comprising a mounting plate attached to the flange.

14. The caster hub of claim 12 further comprising a collar having an aperture therethrough, the aperture being sized to receive the wall therein, but not the flange such that the flange is engageable with the collar.

15. The caster hub of claim 14 wherein the flange and collar have aligned bolt holes for receiving bolts therethrough that will connect the collar and flange together.

16. The caster hub of claim 14 further comprising an extension attached to the collar and extending radially.

17. The caster hub of claim 16 wherein the extension has bolt holes formed therein.

18. A caster hub, comprising:
   a housing having a wall with internal and external surfaces and an axial bore defined by the wall;
   first and second bearings disposed coaxially in the bore of the housing, each bearing having a cylindrical inner race and a cylindrical outer race with the inner and outer races separated by rolling elements, the inner and outer races defining interior and exterior radial end faces of the first and second bearings;
   a seat disposed in the bore and connected to the internal surface of the wall between the first and second bearings, the seat being engageable with the outer races of the bearings at the confronting interior end faces of the bearings;
   an inner spacer disposed in the bore between the first and second bearings, the inner spacer being engageable with the inner races of the bearings at the confronting interior end faces of the bearings; the caster hub further comprising a head extending into the housing having an exterior surface with a coating applied to the exterior surface.

19. A caster hub, comprising:

a housing having a wall with internal and external surfaces and an axial bore defined by the wall;

first and second bearings disposed coaxially in the bore of the housing, each bearing having a cylindrical inner race and a cylindrical outer race with the inner and outer races separated by rolling elements, the inner and outer races defining interior and exterior radial end faces of the first and second bearings;

a seat disposed in the bore and connected to the internal surface of the wall between the first and second bearings, the seat being engageable with the outer races of the bearings at the confronting interior end faces of the bearings;

an inner spacer disposed in the bore between the first and second bearings, the inner spacer being engageable with the inner races of the bearings at the confronting interior end faces of the bearings; the caster hub further comprising an annular seal member mounted to one of the inner and outer races of the bearings and including a resilient seal that engages the internal surface of the housing.

\* \* \* \* \*